(12) United States Patent
McLellan et al.

(10) Patent No.: US 8,091,795 B1
(45) Date of Patent: Jan. 10, 2012

(54) INTELLIGENT THERMOSTAT DEVICE WITH AUTOMATIC ADAPTABLE ENERGY CONSERVATION BASED ON REAL-TIME ENERGY PRICING

(75) Inventors: John R. McLellan, New Orleans, LA (US); Ronald J. Gumina, Mandeville, LA (US); Ryan L. Arbour, New Orleans, LA (US); David A. Hatty, Mandeville, LA (US)

(73) Assignee: Home Automation, Inc., New Orleans, LA (US)

( * ) Notice: Subject to any disclaimer, the term of this patent is extended or adjusted under 35 U.S.C. 154(b) by 674 days.

(21) Appl. No.: 12/173,805

(22) Filed: Jul. 15, 2008

(51) Int. Cl.
*G05D 23/00* (2006.01)
(52) U.S. Cl. ....... 236/51; 236/94; 340/870.17; 700/276; 700/296
(58) Field of Classification Search ............. 236/51, 236/94, 1 C, 46 C; 340/870.16, 870.17; 700/22, 700/276, 296
See application file for complete search history.

(56) References Cited

U.S. PATENT DOCUMENTS

| | | | |
|---|---|---|---|
| 4,228,511 A | 10/1980 | Simcoe et al. | |
| 4,345,162 A | 8/1982 | Hammer et al. | |
| 4,382,544 A | 5/1983 | Stewart | |
| 5,414,640 A | 5/1995 | Seem | |
| 5,572,438 A | 11/1996 | Ehlers et al. | |
| 6,116,512 A | 9/2000 | Dushane et al. | |
| 6,181,985 B1 | 1/2001 | O'Donnell et al. | |
| 6,480,803 B1 | 11/2002 | Pierret et al. | |
| 6,643,567 B2 | 11/2003 | Kolk et al. | |
| 6,798,341 B1 | 9/2004 | Eckel et al. | |
| 6,868,293 B1 | 3/2005 | Schurr et al. | |
| 7,114,554 B2 | 10/2006 | Bergman et al. | |
| 7,225,054 B2 | 5/2007 | Amundson et al. | |
| 2006/0130496 A1 | 6/2006 | Chapman et al. | |
| 2007/0045430 A1 | 3/2007 | Chapman, Jr. et al. | |
| 2007/0045442 A1 | 3/2007 | Chapman, Jr. et al. | |
| 2007/0114295 A1 | 5/2007 | Jenkins | |
| 2007/0241203 A1 | 10/2007 | Wagner et al. | |

*Primary Examiner* — Marc Norman
(74) *Attorney, Agent, or Firm* — Raymond G. Areaux; Ian C. Barras; Carver, Darden, Koretzky, Tessier, Finn, Blossman & Areaux, LLC

(57) ABSTRACT

An Intelligent Thermostat (IT) device and method of use for the retrieval and display of real-time energy demand and energy pricing. The IT device is configured to perform automatic adaptation of energy conservation based on real-time fluctuations in the energy pricing from a Utility Company. The IT device controls a multicolor backlight to immediately notify the user of real-time fluctuations in the energy pricing.

64 Claims, 21 Drawing Sheets

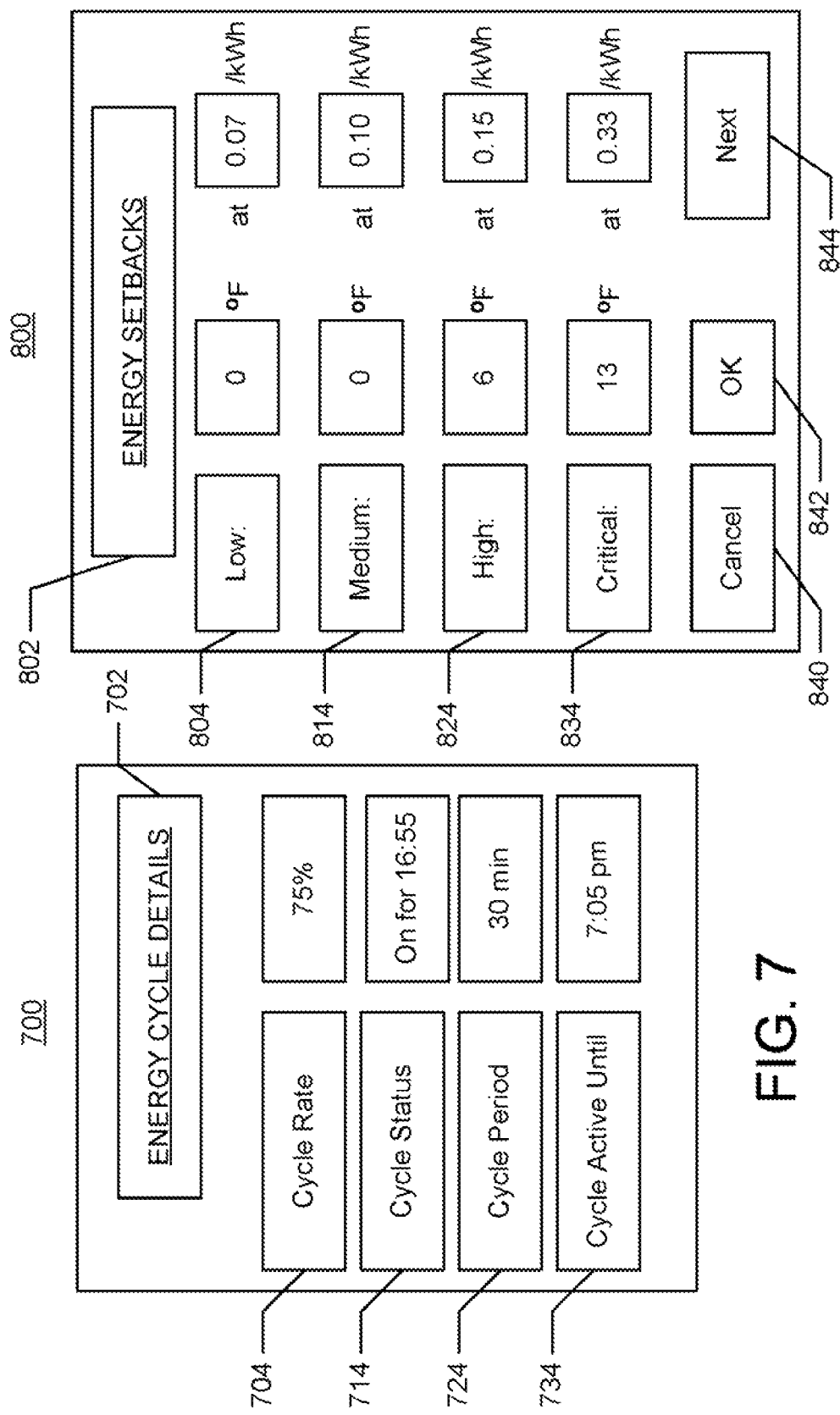

INTELLIGENT THERMOSTAT DEVICE WITH AUTOMATIC ADAPTABLE ENERGY CONSERVATION BASED ON REAL-TIME ENERGY PRICING

BACKGROUND OF THE INVENTION

I. Field

The present invention relates to thermostats and more particularly, to improved techniques for retrieval and display of real-time energy demand and energy pricing and automatic adaptation of energy usage based on real-time fluctuations in said energy pricing.

II. Background

Programmable thermostats allow the user to program various temperature settings so as to conserve energy. However, with the increasing cost of energy, and the general migration toward increased energy conservation or decreased carbon footprints, consumers are demanding improved methods of energy conservation. At the same time, many consumers find energy conservation cumbersome and time consuming.

Many programmable thermostats limit the user's ability to control their home thermostat to meet their own needs. The limitations of such thermostats often stem from the limited nature of the data available to such thermostats. Furthermore, programmable thermostats, by their very nature, provide only limited information to the user.

There is a need for improved techniques for retrieval and display of real-time energy demand and energy pricing and automatic adaptation of energy conservation based on real-time fluctuations in said energy pricing.

SUMMARY OF THE INVENTION

Techniques for retrieval and display of real-time energy demand and energy pricing and automatic adaptation of energy conservation based on real-time fluctuations in the energy pricing are provided.

In one configuration, a thermostat device is contemplated that comprises a processor configured to execute a set of instructions operable to automatically retrieve and display current energy pricing, as set by a utility company, and automatically adjust a current temperature setpoint by a predetermined temperature setback corresponding to a predetermined energy pricing when the current energy pricing, or energy pricing level, corresponds to the predetermined energy pricing or energy pricing level. The thermostat device also includes a memory for storing the current energy pricing or energy pricing level, the predetermined energy pricing or energy pricing level, the current temperature setpoint and the predetermined temperature setback.

The present invention further contemplates a thermostat device having a processor that is further configured to execute a set of instructions operable to determine and display real-time energy demand in conjunction with the current energy pricing.

The present invention further contemplates a thermostat device having a processor that is further configured to execute a set of instructions operable to display a simulated utility meter wherein the real-time energy demand is represented on the simulated utility meter.

The present invention further contemplates a thermostat device having a processor that is further configured to execute a set of instructions operable to calculate a total energy cost for a predetermined period based on the current energy pricing, and display a current Energy Level associated with the current energy pricing, the total energy cost, and the predetermined temperature setback.

The present invention further contemplates a thermostat device comprising a graphic display coupled to the processor; a color driver coupled to the processor; and a multi-color display backlight coupled to the color driver and the graphic display and being configured to change a color of the backlight in response to fluctuations in a current Energy Level determined by the processor based on the current energy pricing or the current energy pricing level.

The present invention further contemplates a thermostat device having a thermostat housing configured to house the processor, the memory, the graphic display, the color driver and the multi-color display backlight wherein the thermostat housing is configured for mounting to a wall.

The present invention further contemplates a thermostat device having a thermostat housing configured to house the processor, the memory, the graphic display, the color driver and the multi-color display backlight wherein the thermostat housing is mobile and includes a surface support to orient the thermostat housing upright.

The present invention further contemplates a thermostat device having a graphic display configured to display a home graphic page display (GPD) comprising one or more of a current temperature, the current temperature setpoint, and at least one energy management message. The home GPD further comprises one or more of an indoor relative humidity, an outdoor relative humidity, period indicator, status indicator, fan mode, and thermostat mode.

The present invention further contemplates a thermostat device having a processor that is further configured to execute a set of instructions operable to receive at least one customized setback setting, the at least one customized setback setting being associated with at least one predetermined energy pricing; and a graphic display configured to display an energy setback GPD comprising a plurality of setback settings each being associated with a respective different energy price or energy price level and wherein at least one of the plurality of setback settings is the at least one customized setback setting.

The present invention further contemplates a thermostat device having a graphic display configured to display an energy GPD, the energy GPD comprising the current energy pricing, the predetermined temperature setback, and a current Energy Level associated with the current energy pricing.

The present invention further contemplates a thermostat device having a graphic display configured to display an energy cycle GPD, the energy cycle GPD comprises a plurality of cycling settings to turn on and off at least one air conditioning or heating system at a cycling rate within a period of time and a plurality of cycling energy prices wherein each cycling setting corresponds to a respective different one of the cycling energy prices; and a processor configured to execute a set of instructions operable to automatically select a cycling setting from the plurality of cycling settings associated with a cycling energy price corresponding to the current energy pricing, or energy pricing level, as a current cycling setting.

The present invention further contemplates a thermostat device having a graphic display configured to display an energy cycle detail GPD, the energy cycle detail GPD comprising the current cycling setting, a cycle period corresponding to the current cycle setting, a time indicative of an expiration time for the current cycling setting and a number of minutes in the period of time for the current cycling setting.

The present invention further contemplates a thermostat device having a processor that is further configured to execute a set of instructions to automatically turn on a fan when the HVAC system is off during the cycle period.

The present invention further contemplates a thermostat device having a processor that is further configured to execute a set of instructions to automatically turn on or off at least one user selected remote load.

The present invention further contemplates a thermostat device having a wireless interface configured to communicate with a utility meter to receive the current energy pricing or pricing level.

The present invention further contemplates a thermostat device having a processor that is configured to convert the temperature setpoint to an Omni format having one whole number to represent corresponding Celsius (° C.) and Fahrenheit (° F.) temperature values.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals.

FIG. 7 illustrates an Energy Cycle Detail GPD in accordance with one embodiment of the present invention.

FIG. 8 illustrates a Energy Setbacks GPD in accordance with one embodiment of the present invention.

FIG. 13 illustrates a Mode Settings GPD in accordance with one embodiment of the present invention.

Figure 1A:
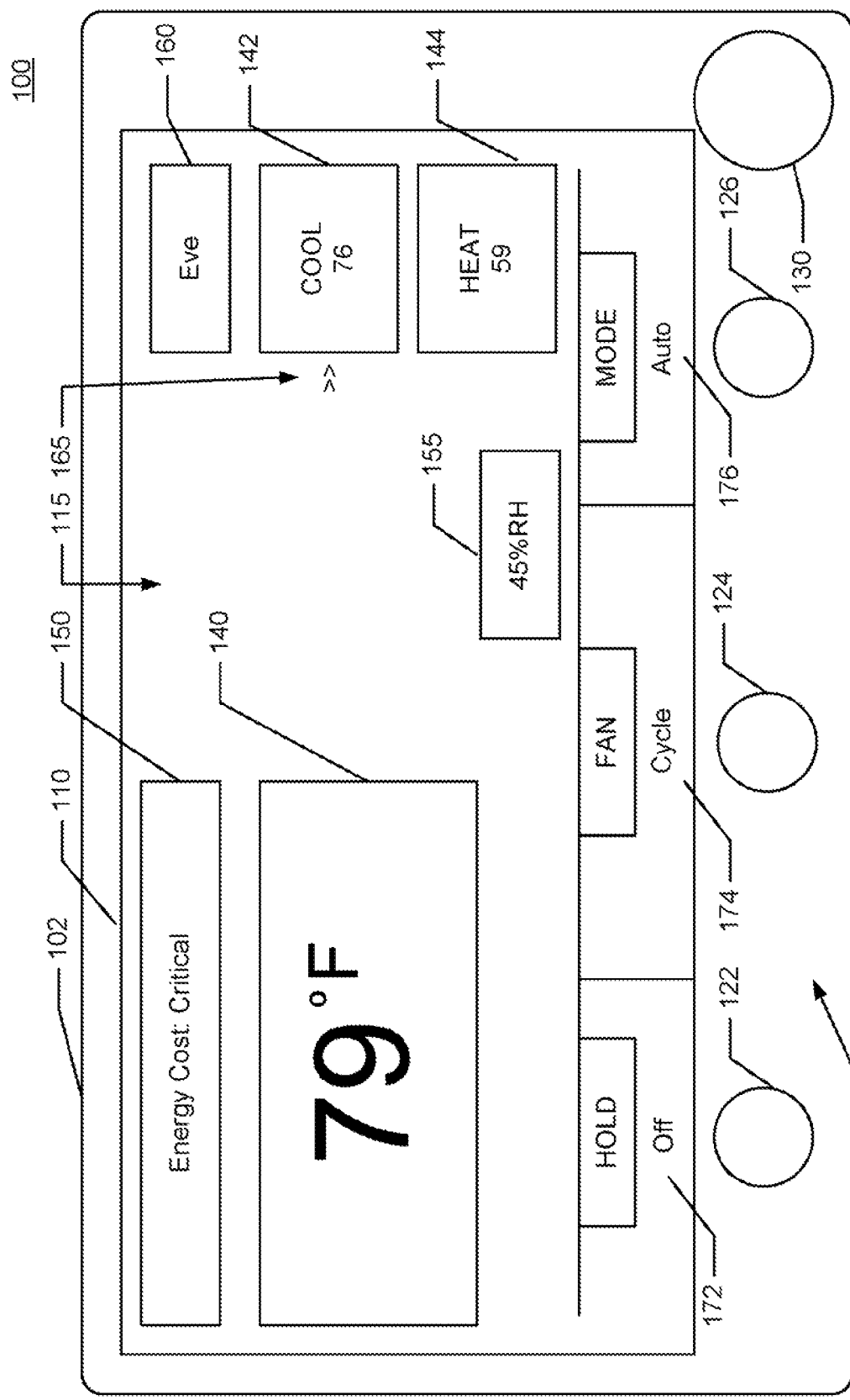
FIG. 1A illustrates an intelligent thermostat device in accordance with one embodiment of the present invention.

The images in the drawings are simplified for illustrative purposes and are not depicted to scale. To facilitate understanding, identical reference numerals have been used, where possible, to designate identical elements that are common to the Figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs. Hereafter, the terms "core", "engine", "machine", "processor" and "processing unit" are used interchangeably.

Figure 1B:
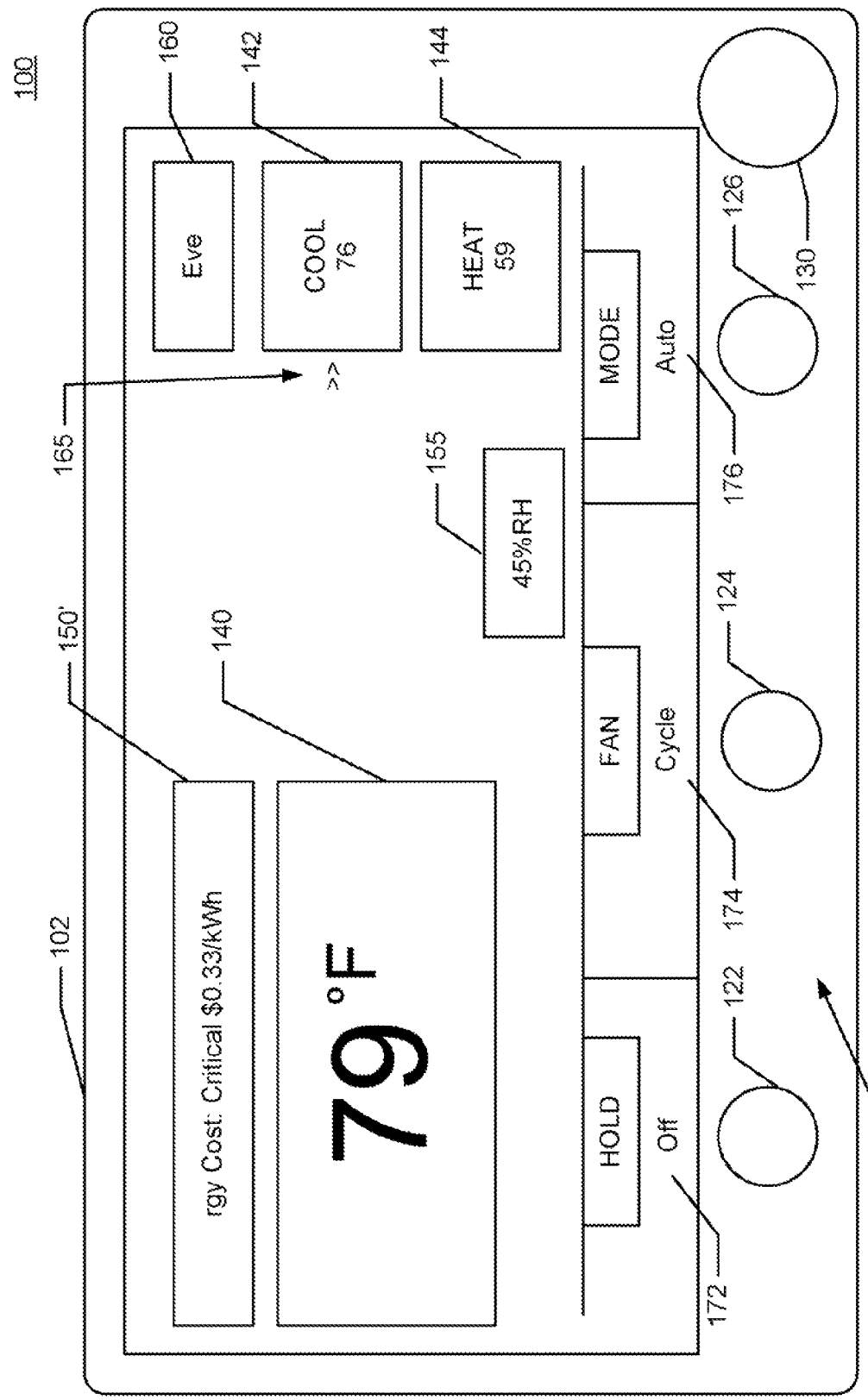
FIG. 1B illustrates the intelligent thermostat device with a programmable scrolling energy management display field.
Figure 2:
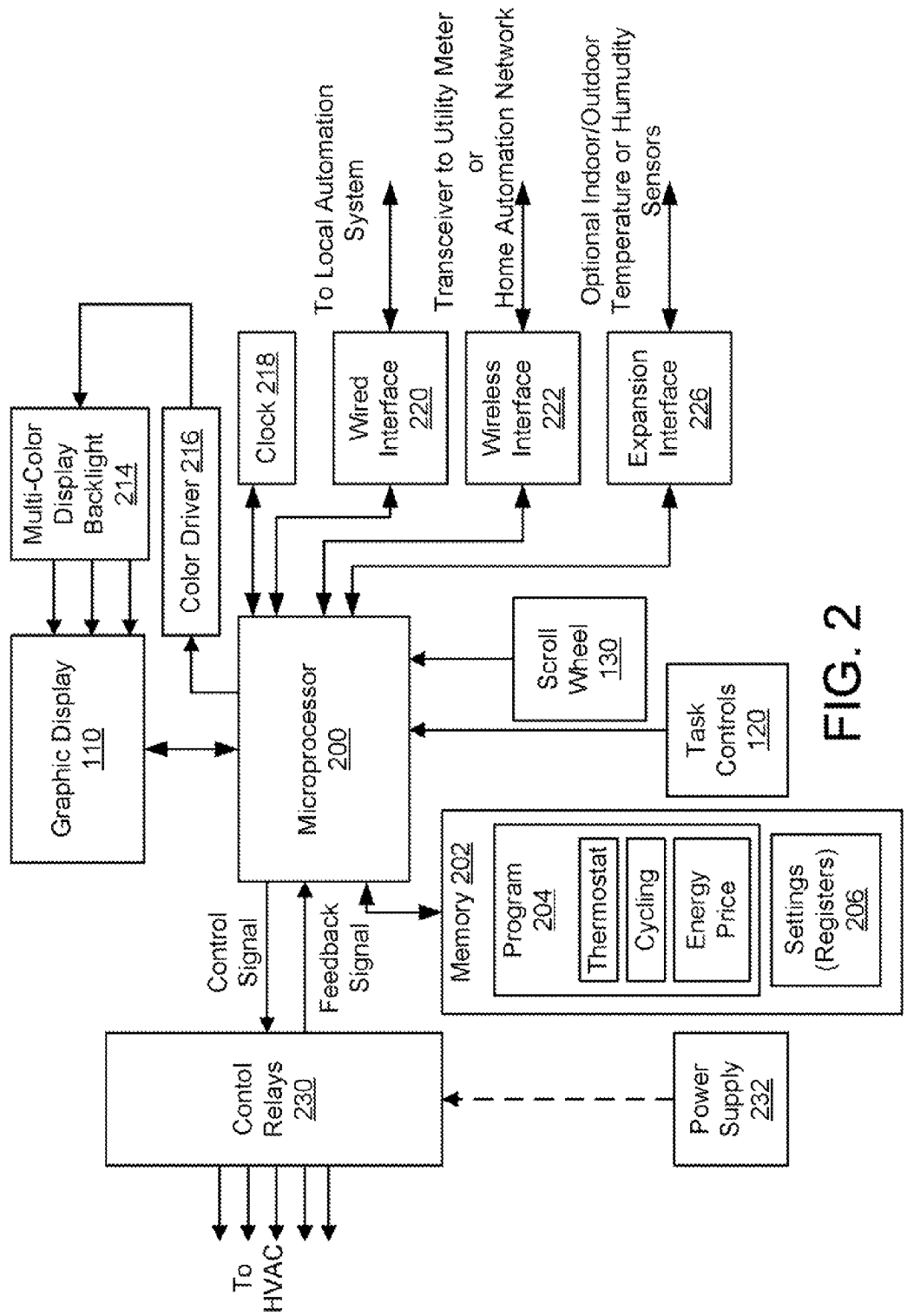
FIG. 2 illustrates a block diagram of the intelligent thermostat device in accordance with one embodiment of the present invention.

Referring now to the drawings and particularly FIGS. 1A-1B and 2, the intelligent thermostat device is designated by the reference numeral 100. The intelligent thermostat device 100 is configured for retrieval and display of real-time energy demand and energy pricing, and automatic adaptation of energy conservation based on real-time fluctuations in the energy pricing.

FIGS. 1A and 1B illustrate an intelligent thermostat device 100 in accordance with one embodiment of the present invention. The intelligent thermostat (IT) device 100 includes a thermostat housing 102 adapted to be mounted to a wall in a home, office or other building structure. The thermostat housing 102 includes a graphic display 110 and a plurality of task controls 120. In the exemplary configuration, the plurality of task controls 120 includes a hold button 122, a fan button 124 and a mode button 126 when the Home GPD 115 is displayed. The plurality of task controls 120 are configured to allow a user to select a task (for example, Hold, Fan or Mode) that is displayed above a respective button when the respective button is pressed. While a push button actuator is shown, other types of buttons, keys or actuators may be used, including a touch-sensitive display or a remote control. As will be seen from the description below, the operation of the plurality of task controls 120 may change from one GPD to another GPD.

FIG. 2 illustrates a block diagram of the IT device 100 in accordance with one embodiment of the present invention. The IT device 100 comprises a microprocessor 200 and memory 202 which stores the IT program 204 (set of instructions) executed by the microprocessor 200 to perform the functions described herein. The program 204 includes a set of instructions for controlling the thermostat, a set of optional instructions for carrying out the cycling features and a set of optional instructions for carrying out the energy conservation techniques, such as load shedding or load reduction, using real-time energy pricing. The program 204 further includes the necessary instructions for generating the GPDs described herein. The memory 202 further comprises storage for Settings 206 (such as Hold Settings, Fan Settings and Mode Settings), as well as the temperature and other user customizable parameters.

The microprocessor 200 is coupled to the graphic display 110, color driver 216, task controls 120, and control wheel 130. The color driver 216 is coupled to multi-color display backlight 214 for automatically changing the backlight in accordance with the process described in relation to FIG. 21, described later. The multi-color display backlight 214 is coupled to the graphic display 110. The operation of the task controls 120 and control wheel 130 will also be described in more detail later.

The background color of the graphic display 110 is configured to indicate the current Energy Level which is based on the received real-time energy price. In an alternate embodiment, the IT device 100 may only receive the current Energy Level without any associated price data. In either case, Table 1 shows an example of the display color coding based on the current Energy Level.

TABLE 1

| Rate | Color |
| --- | --- |
| Critical (most expensive) | Red |
| High | Purple |
| Medium | Blue |
| Low (least expensive) | Green (Default) |

The microprocessor 200 is further coupled to clock 218, and one or more of a wired interface 220, wireless interface 222 and expansion interface 226. The wired interface 220 connects the IT device 100 to a local automation system for communicating various control signals. Devices connected to the IT device 100 as part of the local automation system communicate only to the IT device 100 (for example, any appliances which can be controlled via the IT device 100, as is further discussed below). The wireless interface 222 allows the IT device 100 to communicate with transceiver (T/R) 325 coupled to the Utility Meter 320, to a home automation network 315, or to any other wireless devices such as the Load Interface Units 350 described in more detail below. The Expansion Interface 226 connects the IT device 100 to optional indoor and/or outdoor temperature and humidity sensors 340, and can also serve as an interface for custom communication modules, such as for Ethernet communications.

The microprocessor 200 is further coupled to control relays 230 which communicates control signals to and receives feedback signals from the HVAC system. A power supply 232 is coupled to the control relays 230 for delivering power to the IT device 100.

The IT device 100 is configured to automatically adapt the temperature setpoints of the HVAC system 305 based on program schedules and/or programmed or received real-time energy level rates (pricing) for each energy level, and days and times corresponding to each rate. The IT device 100 is further configured to incorporate certain time-based cycling restrictions on operation of any HVAC or heating systems controlled by the IT device 100, where said cycling restrictions may also be triggered by certain real-time energy level rates.

Figure 3:
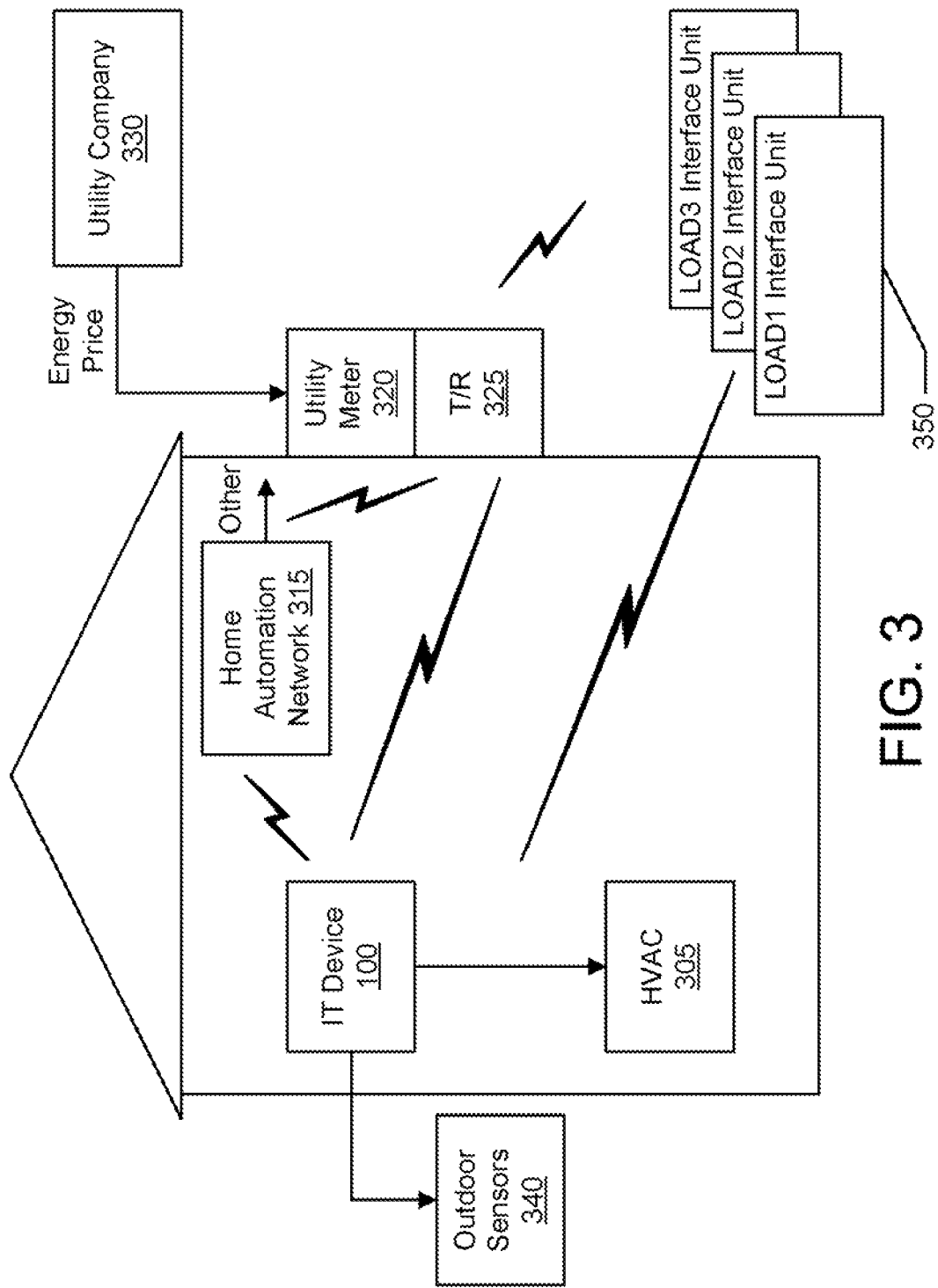
FIG. 3 illustrates a block diagram of an Intelligent Thermostat Network (ITN) 300 in accordance with one embodiment of the present invention.

FIG. 3 illustrates a block diagram of an Intelligent Thermostat Network (ITN) 300 in accordance with one embodiment of the present invention. The ITN 300 includes the IT device 100 coupled to a home, office or building HVAC system 305. The IT device 100 controls the setpoint temperatures of the HVAC system 305 based on a default or customized program schedule as well as any received real-time energy pricing from a Utility Company 330. The IT device 100 may also be coupled to outdoor sensors 340 which may include temperature sensors and humidity sensors. The IT device 100 may also communicate with the Utility Meter 320 via transceiver (T/R) 325, the Utility Meter 320 being in communication with the Utility Company 330 to receive the real-time energy pricing.

The IT device 100 may also communicate to a home automation network 315 that is coupled to a computing device such as a personal computer (PC), server, processing board or other computing device. The server and/or PC may also be connected to other communication networks such as local area networks (LAN), Internet, intranet, etc. The home automation network 315 may also be connected to other appliances or multimedia devices in the home, office or building. The home automation network 315 may be in communication with the transceiver (T/R) 325 at the Utility Meter 320.

Figure 15:
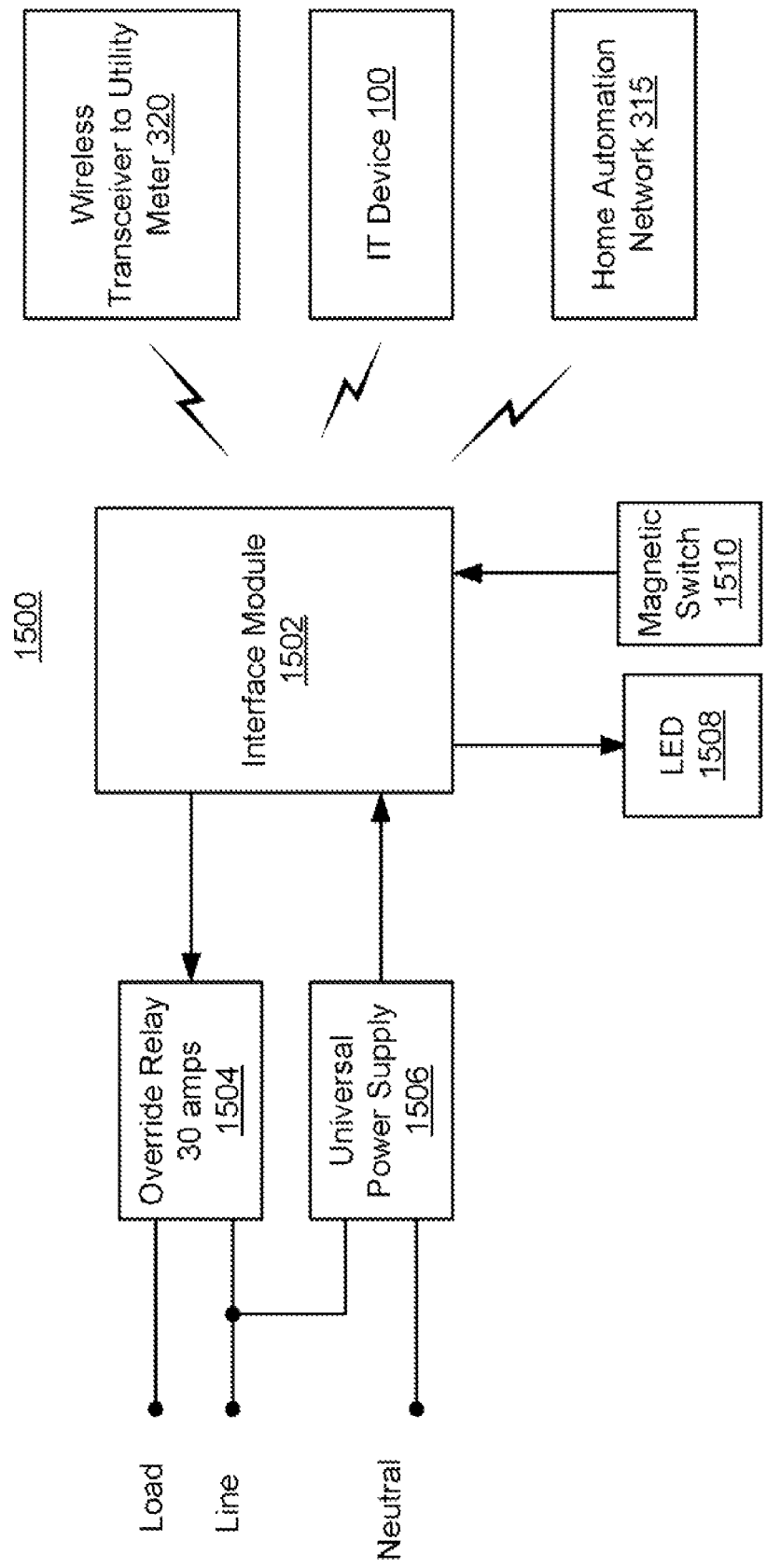
FIG. 15 illustrates a block diagram of an LOAD interface unit for load balance and control in accordance with one embodiment of the present invention.

The ITN 300 may further comprise one or more Load Interface Units 350 described in relation to FIG. 15. The Load Interface Units 350 may be in communication with the IT device 100. The Load Interface Units 350 may also be in communication with the transceiver (T/R) 325 coupled to the Utility Meter 320. In one configuration, the Utility Company 330 may remotely turn on (engage) or turn off (shed) the Loads (i.e., pool pump, fountain, and water heater) coupled to the one or more Load Interface Units 350.

Returning again to FIGS. 1A and 1B, the display 110 has a "current hold mode" field 172, a "fan mode" field 174 and a "device mode" field 176. The fields 172, 174 and 176 each includes a legend (i.e., hold, fan, and mode) and a current (hold, fan or mode) setting.

Figure 4:
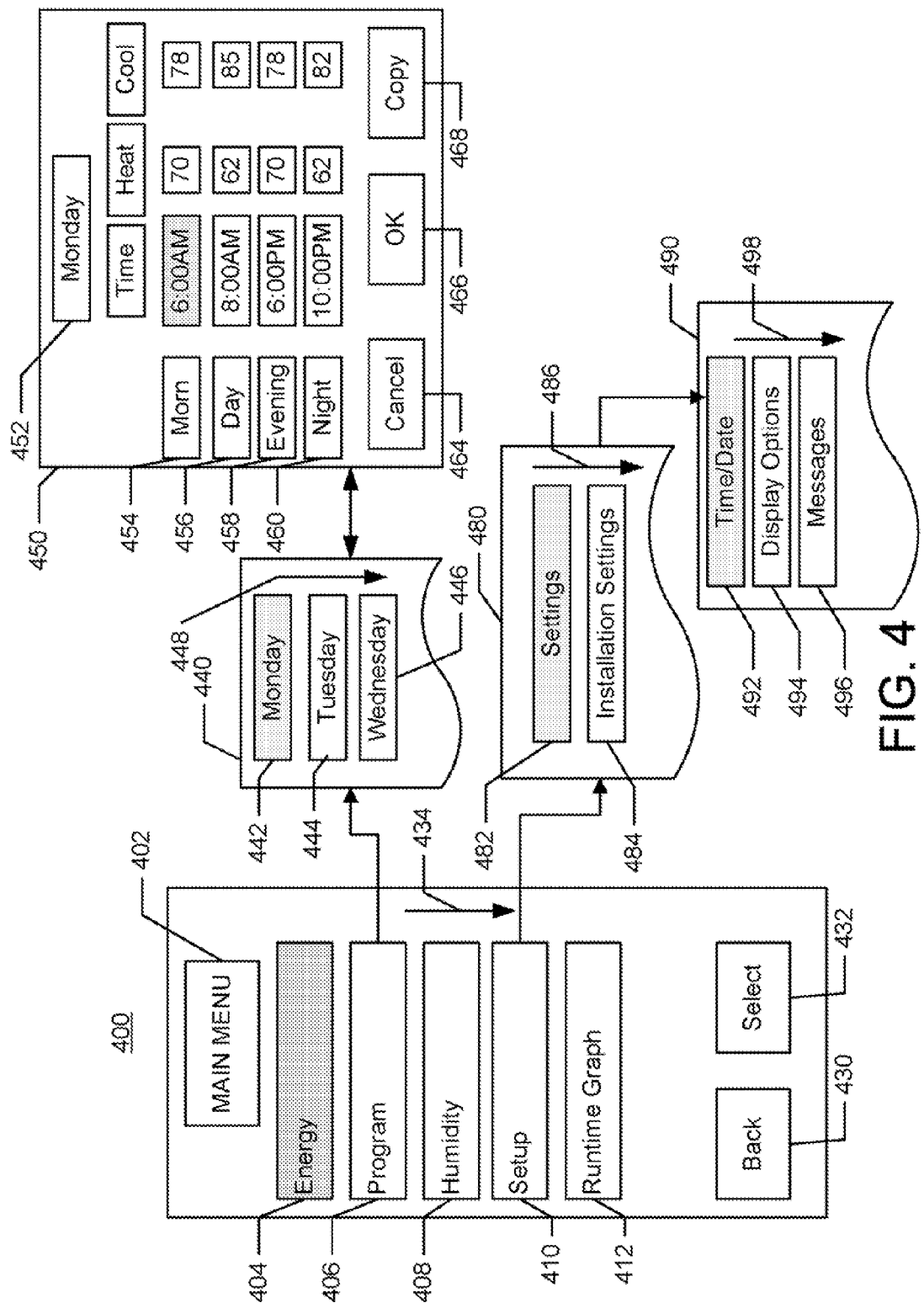
FIG. 4 illustrates a Main Menu graphical page display (GPD) in accordance with one embodiment of the present invention.

The IT device 100 further includes a control wheel 130 configured to adjust temperatures, navigate menus, and change values and settings, when turned. Pressing or actuating the control wheel 130 selects or navigates to a graphical main menu page display 400, as best seen in FIG. 4. Pressing the control wheel 130 may also be used to make a selection or confirmation of a setting. In one embodiment, the IT device 100 has several GPDs of details that can be displayed, and these pages may be accessed by pressing the control wheel twice.

The display 110 is also configured to display a plurality of changeable parameters of the IT device 100. The display 110 includes a large graphical display that has a customizable multicolor backlit display. The display 110 is configured to display everything necessary for the operation of the HVAC system 305 and to monitor temperature and humidity. For example, the display 110 includes a temperature display field 140. The temperature display field 140 displays the current indoor temperature. The display 110 further includes a Cool Setting field 142 and a Heat Setting field 144, each having associated therewith a legend and a temperature setting value. The Cool Setting field 142 displays the desired cool or air conditioning (AC) setting for the HVAC setting. The Heat Setting field 144 displays the desired heat or Heater setting for the HVAC system. In one embodiment, IT device 100 includes a proximity sensor which activates the backlighting in display 110 for easy viewing.

The display 110 further includes an Energy Management Message Bar (EMMB) Field 150. In one configuration, the EMMB Field 150 may be a scrolling message bar and may be programmed by the user. The EMMB Field 150 displays an indication of the current energy level and/or the real-time current energy price. The EMMB Field 150 may have a scrolling function so as to display a 5 second cycle of messages enabled in setup. If both the current energy level and the current energy price are enabled, the message will scroll to display the entire message 150', as seen in FIG. 1B (noting that the missing letters in message 150' in FIG. 1B are meant to be indicative of scrolling text). The current energy level is one of a plurality of energy levels. The plurality of energy levels may include Low, Medium, High, or Critical, as will be described in detail later.

Figure 20:
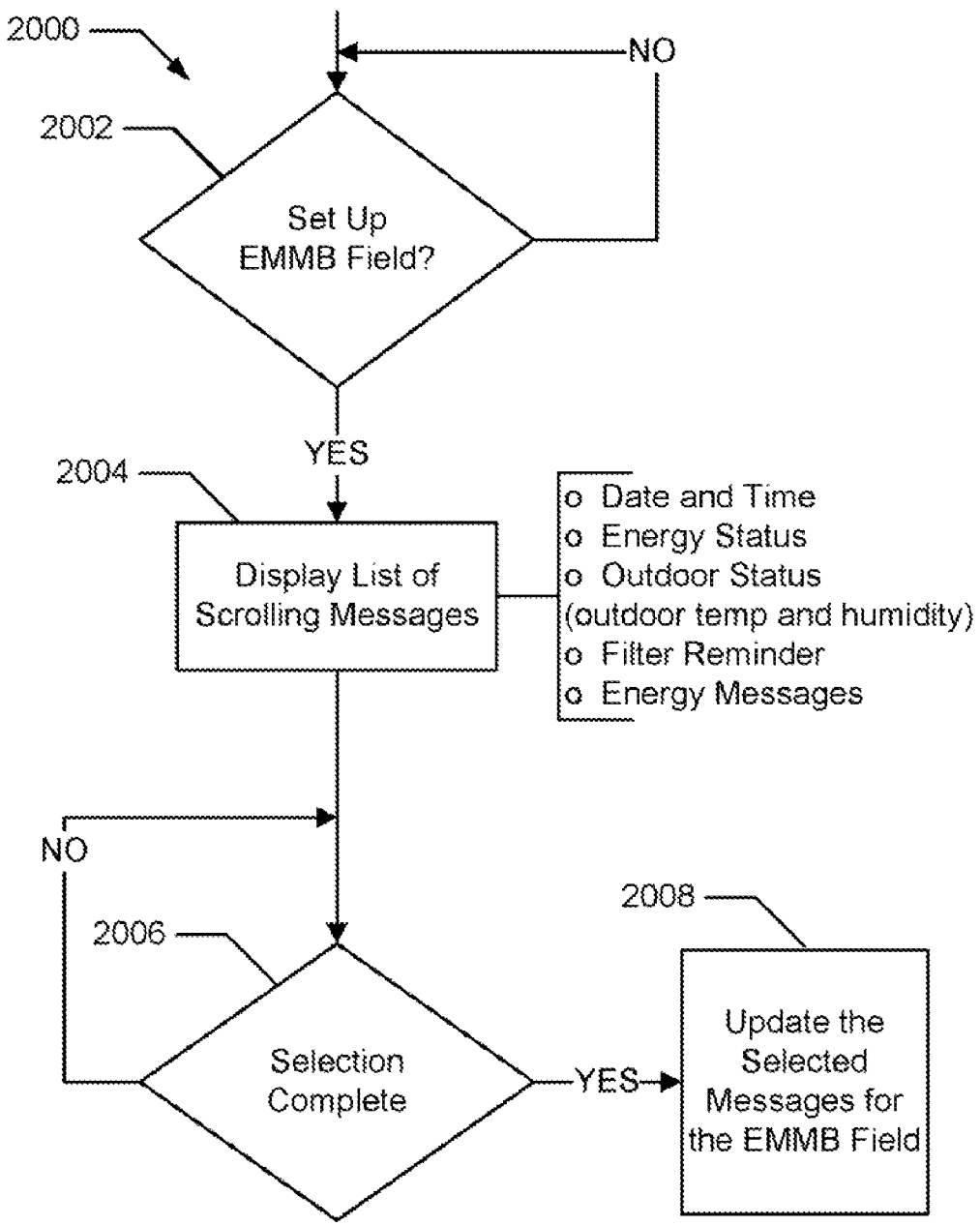
FIG. 20 illustrates a flowchart of a process to customize a Energy Management Message Bar (EMMB) field to in accordance with one embodiment of the present invention.

The EMMB Field 150 is customizable by the user and has a plurality of messages that the user may select (see FIG. 20).

Figure 11:
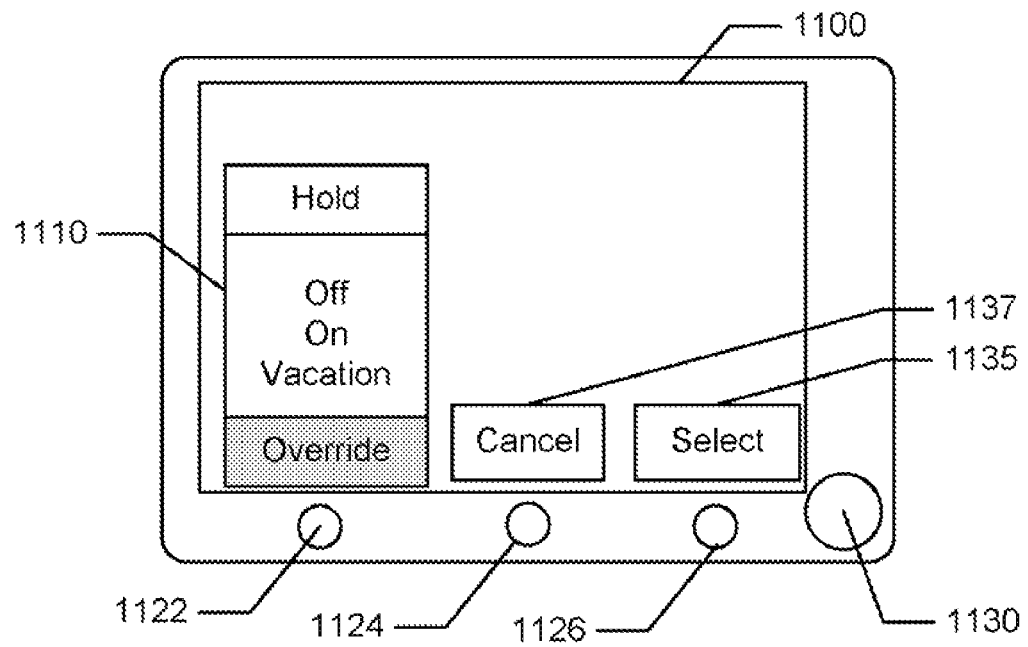
FIG. 11 illustrates a Hold Settings GPD in accordance with one embodiment of the present invention.

Pressing or actuating the hold button 122 displays a Hold Settings graphical page display (GPD) 1100 with a drop down menu list of Hold Settings 1110, as best seen in FIG. 11. The Hold Settings GPD 1100 indicates modifications to the modes of operation of the plurality of task controls 120. When, the Hold GPD 1110 is displayed, the drop down menu list of Hold Settings 1110 is positioned above and associated with the hold button 1122. The Hold Settings GPD 1100 also displays a Cancel Legend 1137 that is associated with a Cancel button 1124 (formerly fan button 124) and a Select Legend 1135 that is associated with a Select button 1126 (formerly mode button 126). Actuation of the Cancel button 1124 cancels the Hold GPD 1100 and the IT device 100 will transition back to the Home GPD 115, as best seen in FIGS. 1A and 1B.

The control wheel 1130 is used to scroll down the list of Hold Settings by rotating or turning the wheel 1130 wherein as the list of Hold Settings is scrolled, a respective one entry is highlighted. In this example, "Override" is highlighted. The highlighted entry may be selected by pressing the Select button 1126 or pressing the control wheel 1130. Once a Hold Setting is selected, the IT device 100 automatically navigates back to the Home GPD 115, as best seen in FIGS. 1A and 1B, and the Hold Setting is updated to the setting selected.

The drop down menu list of Hold Settings 1110 may comprise Off, On, Vacation, and Override. The hold Off setting is configured to cause the IT device 100 to respond to program schedules and remote system temperature setting changes. The hold On setting is configured to cause the IT device 100 to ignore the program schedule and remote system temperatures setting changes. The hold Vacation setting is configured to cause the IT device 100 to ignore the program schedule and remote system temperature setting changes for the duration corresponding to a scheduled time away for vacation. A separate Vacation GPD (not shown) is provided to enter a scheduled vacation and temperature settings. The list of Hold Settings 1110 may also include an Away setting (not shown). The Away setting allows the user to place the IT device 100 in an Away mode where the IT device 100 adjusts the temperature settings to a customized temperature setting, such as established by the user, suitable for a period of time when no one will be in the home, office or building.

If the user wishes to override (disable) the energy management features, the user highlights the "Override" entry in FIG. 11. Thus, the IT device 100 will no longer change temperature settings or cycle restrictions based on energy cost. When the "Override" entry is selected, the user may be prompted with a warning message. The user may restore the energy management features. To restore (enable) the energy management features, the user presses the hold button 1122 and highlights and selects "Off". The IT device 100 will automatically change temperature settings and/or cycle restrictions based on energy cost or other pre-programmed criteria.

Figure 12:
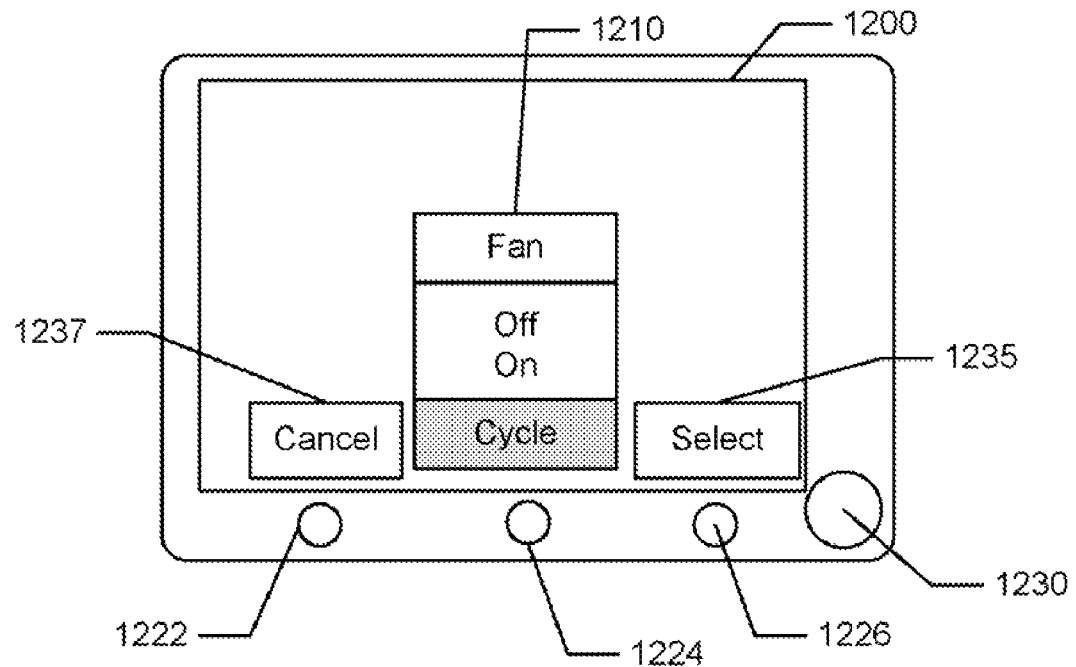
FIG. 12 illustrates a Fan Settings GPD in accordance with one embodiment of the present invention.

Pressing or actuating the fan button 124 displays a Fan Settings GPD 1200 with a drop down menu list of Fan Settings 1210, as best seen in FIG. 12. The Fan Settings GPD 1200 modifies the modes of operation of the plurality of task controls 120. When the Fan Settings GPD 1200 is displayed, the drop down menu list of Fan Settings 1210 is positioned above and associated with the fan button 1224. The Fan Settings GPD 1200 also displays a Cancel Legend 1237 that is associated with a Cancel button 1222 (formerly hold button 122) and a Select Legend 1235 that is associated with a Select button 1226 (formerly mode button 126). Actuation of the Cancel button 1222 cancels the Fan Settings GPD 1200 and the IT device 100 will transition back to the Home GPD 115, as best seen in FIGS. 1A and 1B.

The control wheel 1230 is used to scroll down the list of Fan Settings 1210 wherein as the list of Fan Settings 1210 is scrolled, a respective one entry is highlighted. In this example, "Cycle" is highlighted. The highlighted entry may be selected by pressing the Select button 1226 or the control wheel 1230. Once a Fan Setting 1210 is selected, the IT device 100 automatically navigates back to the Home GPD 115, as best seen in FIGS. 1A and 1B, and the Fan Setting 1210 is updated to the selected setting. The drop down menu list of Fan Settings 1210 may comprise Off, On, and Cycle.

Pressing the fan button 1224 displays a list of Fan Setting and once a selection is made displays the current fan mode: Auto, On, or Cycle. The fan auto setting controls the fan to run only when the IT device 100 calls for heating or cooling. The fan on setting controls the fan to run continuously. The fan cycle setting cycles the fan on and off every 10 minutes (or some other predetermined time delay) to circulate the air.

Pressing or actuating the mode button 126 displays a Mode Settings GPD 1300 with a drop down menu list of Mode Settings 1310, as best seen in FIG. 13. The Mode Settings GPD 1300 modifies the modes of operation of the plurality of task controls 120. When the Mode Settings GPD 1300 is displayed, the drop down menu list of Mode Settings 1310 is positioned above and associated with the mode button 1226. The Mode Settings GPD 1300 also displays a Cancel Legend 1337 that is associated with a Cancel button 1322 (formerly hold button 122) and a Select Legend 1335 that is associated with a Select button 1324 (formerly fan button 124). Actuation of the Cancel button 1322 cancels the changes and the IT device 100 will transition back to the Home GPD 115, as best seen in FIGS. 1A and 1B.

The control wheel 1330 is used to scroll down the list of Mode Settings wherein as the list of Mode Settings is scrolled, a respective one entry is highlighted. In this example, "Auto" is highlighted. The highlighted entry may be selected by pressing the Select button 1326 or the control wheel 1330. Once a Mode Setting is selected, the IT device 100 automatically navigates back to the Home GPD 115, as best seen in FIGS. 1A and 1B, and the Mode Setting is updated to the selected setting. The drop down menu list of Mode Setting 1310 may comprise Off, Heat (Heater), Cool (Forced Cold Air Conditioning System operations), Auto (automatic), or EM Heat (Emergency Heat for heat pump systems). The mode off setting is configured to cause the IT device 100 to turn off the heating and air conditioning systems and to not respond to changes in the temperature settings. The heat setting causes the heating system to respond to maintain the desired heating temperature settings. The cool setting causes the AC to respond to maintain the desired cooling temperature settings. The auto setting causes the IT device 100 to automatically switch between heat and cool to maintain the desired heating and cooling temperature settings. The emergency heat setting is used for heat pumps with auxiliary heat. The EM heat causes the IT device 100 to turn off the heat pump and use the auxiliary heating to maintain the heating temperature setting. The EM heat is typically used only if the heat pump is malfunctioning because the auxiliary heat typically costs more to operate than the heat pump.

The IT device 100 may have a humidity sensor attached thereto or may be coupled to a remote computing device which is able to provide a value corresponding to relative humidity. In either case, the display 110 displays the Relative Humidity (RH) in a RH field 155. When an optional humidity sensor is connected, or a value for Relative Humidity is supplied via some other networked device, the current relative humidity may be displayed.

The display 110 further includes a Period Indicator field 155. The Period Indicator is selected from the group: Morn, Day, Eve, or Night. The Period Indicator is displayed when scheduled temperature changes are made by the program 204.

The display 110 further includes Status Indicators 165. The Status Indicators 165 include a ">", ">>" or no symbol next to one of the Cool Setting field 142 or a Heat Setting field 144. A ">" symbol indicates that a 1st stage of the HVAC system is running. If the AC is running, the Status Indicator 165 would be displayed next to the Cool Setting field 142. If the Heater is running, the Status Indicator 165 would be displayed next to the Heat Setting field 144. The ">>" symbol indicates $1^{st}$ and $2^{nd}$ stages of AC or Heater is operational. The Status Indicator 165 will flash to indicate that the desired cooling or heating temperature setting has been reached.

The IT device 100 controls the turning on of the HVAC system 305 and/or heat pump (not shown). If the compressor of the HVAC system 305 and/or heat pump (not shown) is started too soon after being turned off, damage can occur to the compressor(s). The IT device 100 employs a safety delay before turning on a compressor. After the safety delay, the IT device 100 will start the compressor and the Status Indicators will stop flashing. When the energy price level decreases such that a setback associated with a higher energy level is removed thereby allowing the current temperature setpoint to revert to a lower temperature (or higher in the winter), the IT device 100 enforces a 1-4 minute random delay before activating the HVAC system 305. The random delay can be overridden by manually adjusting setpoints.

Offsets (for example, setbacks) to the original setpoints are maintained through internal scheduled setpoint changes but can be overridden by manually changing the setpoint. Once the offset is manually overridden, the setbacks are overridden until either the energy level rises or lowers or until some other pre-programmed criteria changes the current temperature setpoint.

Figure 5:
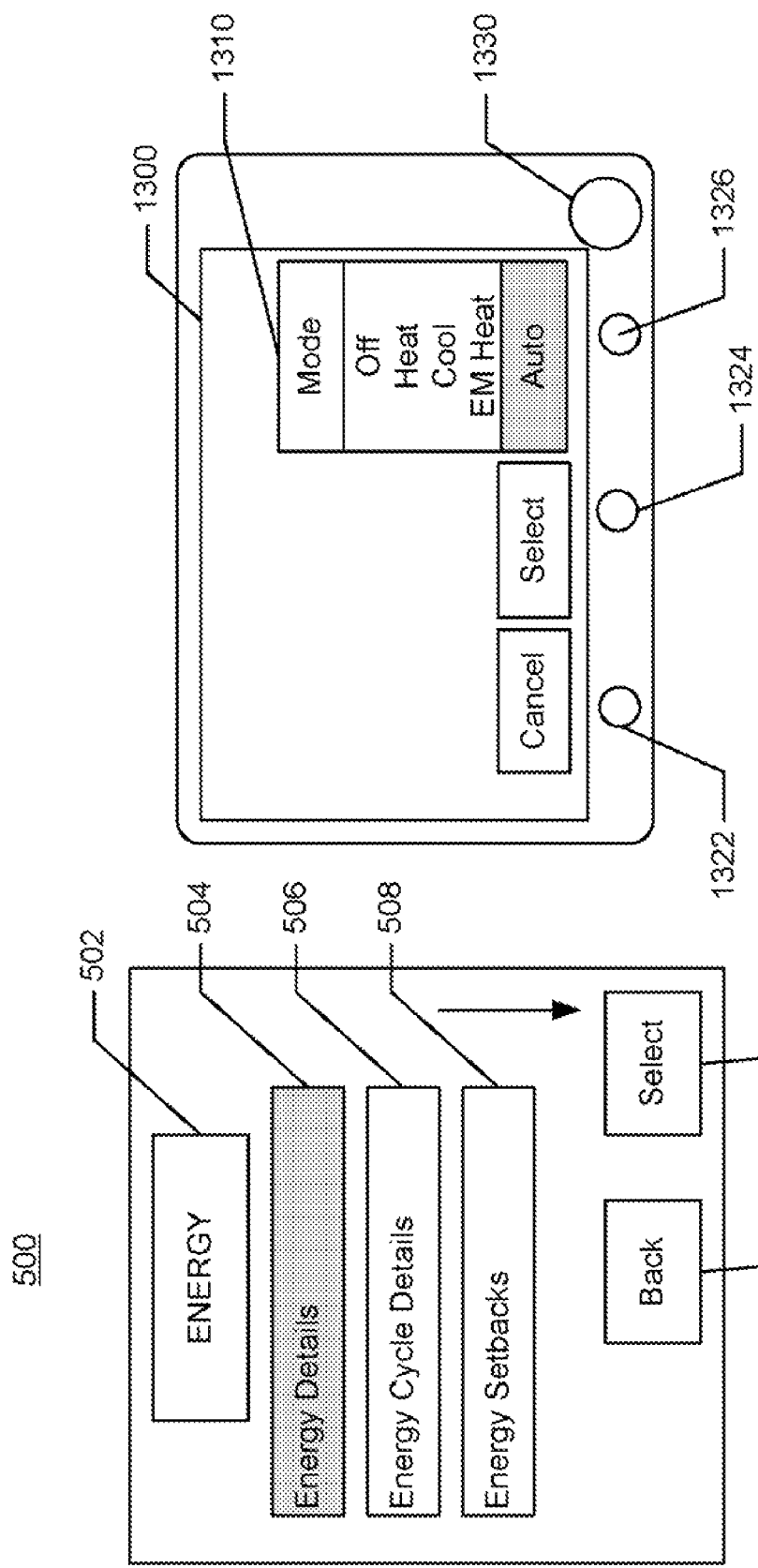
FIG. 5 illustrates an Energy GPD in accordance with one embodiment of the present invention.

The IT device 100 is preprogrammed with energy management features that are used in conjunction with the program 204. The user may view these settings at any time using the Energy GPD 500 (FIG. 5). There are several parameters that may be modified to maximize energy savings and comfort based on a user's lifestyle.

Figure 23:
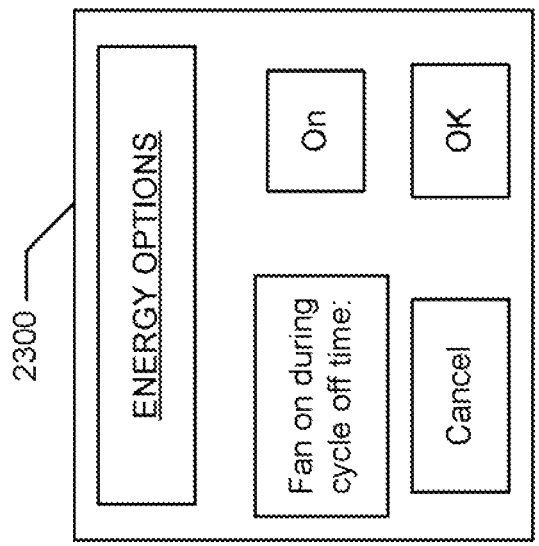
FIG. 23 illustrates a Energy Options GPD 2300 in accordance with one embodiment of the present invention.

When enabled, the following energy management GPDs are provided: Energy Details GPD 600 (FIG. 6), Energy Cycling Details GPD 700 (FIG. 7), Energy Setbacks GPD 800 (FIG. 8), Energy Cycle GPD (FIG. 9), Load Control Modules GPD 1400 (FIG. 14), and Energy Options GPD 2300 (FIG. 23).

FIG. 4 illustrates a Main Menu GPD in accordance with one embodiment of the present invention. To view or change the energy management features, one would press the control wheel 130 once to display the Main Menu GPD 400. The Main Menu GPD 400 displays a Main Menu legend 402 and includes a list of energy management features. In one embodiment, the energy management features include Energy 404, Program 406, Humidity 408, Setup 410 and Runtime Graph 412. Other features may also be provided.

In the example of FIG. 4, Energy 404 is highlighted. The user may select the energy management feature Energy 404 by pressing the control wheel 130 to view or change the energy management features of the program 204. After selecting Energy 404, the IT device 100 will automatically navigate to and display an Energy GPD 500, as best seen in FIG. 5. The user may also select the highlighted energy management feature by selecting the Select legend 412 using an associated task control 120. The user may navigate back to the Home GPD 115 by selecting the Back legend 410 using an associated task control 120.

Furthermore, turning the control wheel 130 changes the highlighted energy management feature. Selecting the energy management feature Program 406 displays a Program GPD 440 (only a portion shown). The Program GPD 440 provides a list of the days of the week (e.g., Monday 442, Tuesday 444, Wednesday 446, Thursday, Friday, Saturday and Sunday) to program heating and cooling settings. The Arrow 448 indicates additional entries in the list of the days of the week.

When selecting a particular day of the week, a Program Schedule GPD 450 is displayed. The Program Schedule GPD 450 has a legend 452. In this example, the legend 452 is "Monday" corresponding to the day of the week selected in the Program GPD 440. The Program Schedule GPD 450 provides the user with the ability to enter a temperature for Heat or Cool for each daily period "Morning" on line 454, "Day" on line 456, "Evening" on line 458 and "Night" on line 460. Additionally, a specific time in which to begin the period is also provided so that the user can customize the program schedule in accordance with said user's own schedule. Table 2 illustrates a default program schedule for establishing setpoint temperatures for the HVAC system 305.

TABLE 2

| Settings | | | |
|---|---|---|---|
| | Time | Cooling | Heating |
| Morning | 6 am To 8 am | 73 deg | 68 deg |
| Day | 8 am To 6 pm | 78 deg | 60 deg |
| Evening | 6 pm To 10 pm | 73 deg | 68 deg |
| Night | 10 pm To 6 am | 75 deg | 62 deg |

In the example of FIG. 4, the cell in the Time column corresponding to "Morn", in line 456, is shown highlighted. The highlighted cell may be changed to a different value, as desired. Additionally, the cells in the Heat column correspond to a scheduled temperature for heating. The cells in the Cool column correspond to a scheduled temperature for the AC. It should be noted that the values in the cells in the Time column, the Heat column and the Cool column may be preprogrammed with default values. The default values may be designed for energy efficiency.

The default values may be customized by the user. The Program GPD 440 further includes legends Cancel 464, OK 466 and Copy 468 actuated by a particular one of the plurality of task controls 120. Cancel 464 allows the Program GPD 440 to be turned off. Selecting OK 466 allows the user to enter the changes. Selecting Copy 468 allows the user to copy the settings associated with the currently displayed day to additional days, such as Tuesday, Wednesday, etc., in order to save the user time in programming their preferred schedule.

Selecting the energy management feature Setup 410 displays a Setup GPD 480 (only a portion shown). The Setup GPD 480 displays a list of settings. In this example, the list includes Settings 482 and Installation Settings 484. The Arrow 486 indicates that additional entries are available. Selecting the Settings 482 displays a Settings GPD 490. The list of settings in the Settings GPD 490 includes Time/Date 492, Display Options 494 and Messages 496. The Arrow 498 indicates that additional entries are available.

Both the Program GPD 440, the Program Schedule GPD 450, and the Setup GPD 480 include Back and Select legends (not shown) associated with a particular one of the plurality of task controls 120. Selecting the Back legend allows the user to navigate back the previous GPD. Selecting the Select legend allows the user to select a particular entry in the displayed list.

FIG. 5 illustrates an Energy GPD 500 in accordance with one embodiment of the present invention. The Energy GPD 500 includes an Energy legend 502 and displays a list of Energy GPDs. The list of Energy GPDs includes Energy Details 504, Energy Cycle Details 506 and Energy Setbacks 508. Other Energy GPDs may also be provided.

Figure 6:
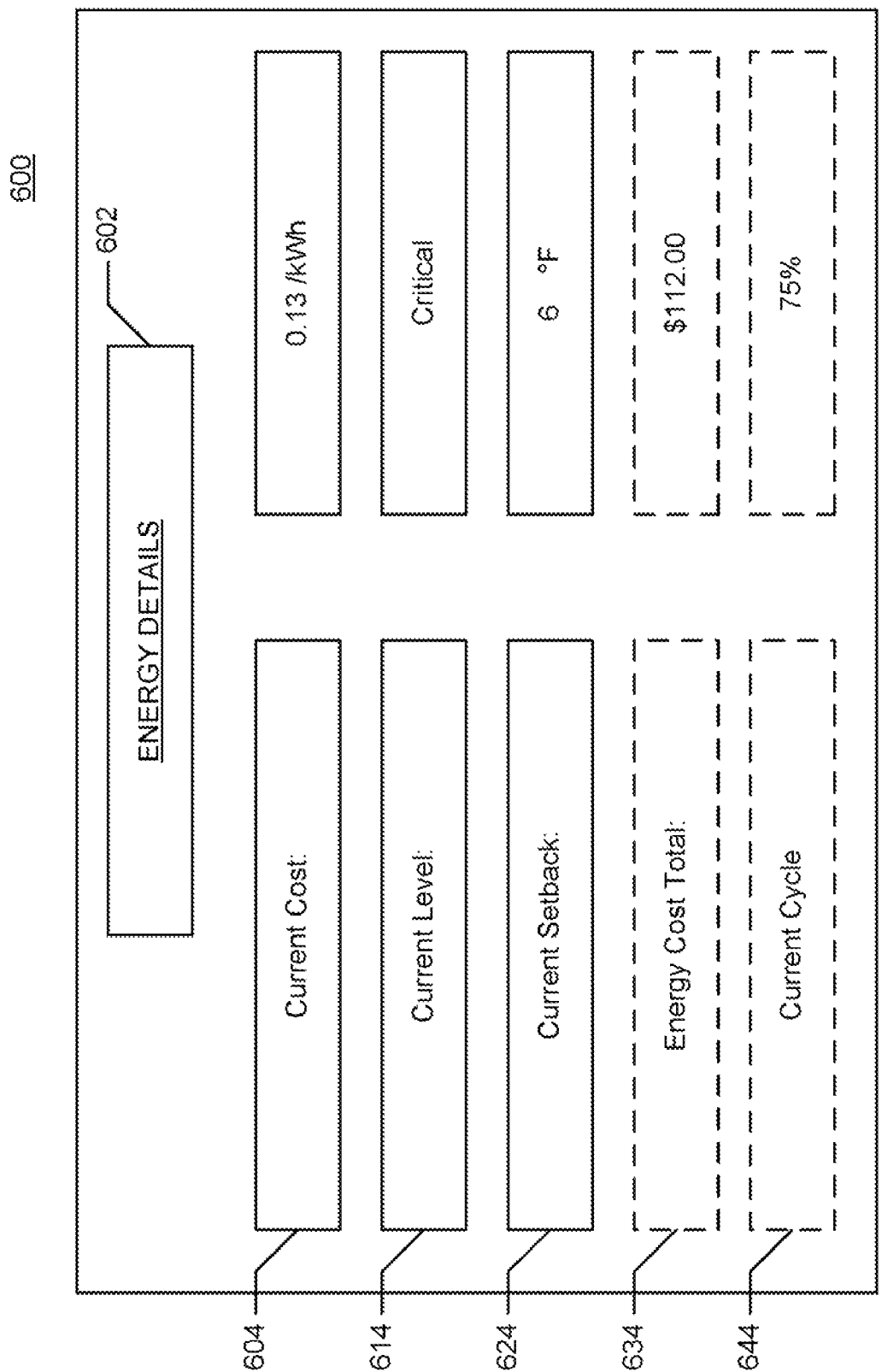
FIG. 6 illustrates an Energy Details GPD in accordance with one embodiment of the present invention.

In the example of FIG. 5, Energy Details 504 is highlighted. The user may select the Energy Details GPD by pressing the control wheel 130 to view or change Energy Details of the program 204. After selecting Energy Details 504, the IT device 100 will automatically navigate to and display an Energy Details GPD 600, as best seen in FIG. 6. The user may also select the highlighted Energy GPD by selecting the Select legend 512 using an associated one of the plurality of task controls 120. The user may navigate back to the Home GPD 115 by selecting the Back legend 510 using the associated task control 120. Additionally, turning the control wheel 130 changes the highlighted energy management feature, and pressing the control wheel 130, or pressing the task control 120 associated with Select legend 512, displays an Energy Details GPD 600.

FIG. 6 illustrates an Energy Details GPD 600 in accordance with one embodiment of the present invention. The energy details on the Energy Details GPD 600 are listed in rows with a legend and associated information next to the legend on the same line. On line 604, there is displayed a legend "Current Cost" with an associated current energy cost value in Dollars per Kilowatt hours (kWh). On line 614, there is displayed a legend "Current Level" with an associated current energy level. The current energy level is determined by the IT device 100 based on the real-time energy cost received from the Utility Company 330 (FIG. 3). On line 624, there is displayed a legend "Current Setback" with an associated current temperature setback as it relates to the current energy level displayed on line 614. The current setback corresponds to a number of degrees the current temperature setpoint (to wit, the temperature at which the HVAC or heating system will be activated) will be reduced when heating is on or increased when the AC is on. The current setback will automatically change with the change of the determined current energy level. On line 634, there is displayed a legend "Energy Cost Total" with an associated dollar value corresponding to a sum total of energy cost as measured by the Utility Meter 320 for a predetermined period. The predetermined period may be synchronized to a billing cycle by the Utility Company 330. Nonetheless, other periods of accumulation may be used such as Weekly, Daily, Monthly, etc. After the predetermined period, the sum total of energy cost on line 634 would be reset to $0.00.

On line 644, there is displayed an optional legend "Current Cycle" (shown in phantom) with an associated percentage of a cycle length. The cycle length is the amount of time that the heating and air conditioning system is restricted. The current cycle may automatically change with the change of the determined current energy level.

Returning again to FIG. 5, selecting the Energy Cycle Details 506, the IT device 100 navigates to an Energy Cycle Detail GPD 700 in FIG. 7. However, if the Energy Setbacks 508 is selected, the IT device 100 navigates to the Energy Setbacks GPD 800 in FIG. 8.

The cycling feature is another way of controlling the energy demand of the HVAC system 305. When enabled, the HVAC system 305 will follow a customizable cycle. This cycle will enforce a period of time during which the operation of the HVAC system 305 will be restricted. A goal is to have each HVAC system 305 in a given home, office or building under a slightly different cycle so that a percentage of the HVAC system 305s are always off at any specific time. Another goal is to provide a method of further restricting the operation of the HVAC system in a given home, office or building in addition to temperature setpoints and energy level based setbacks.

In one embodiment, cycling can be controlled by either the current energy level or by one specific rate. The Energy Cycle Detail GPD 702 displays a list of cycling features. The list of cycling features includes Cycle Rate on line 704, Cycle Status on line 714, Cycle Period on line 724 and Cycle Active Until on line 734. The Cycle Rate on line 704 may have a value within the range of 0-85 percent (inclusive). The Cycle Period on line 724 may have a value within the range of 15-60 minutes (inclusive). The Cycle Status on line 714 displays a message to indicate that the cycle is on. The message on line 714 may include the accumulative time in which the current cycle has been active. The Cycle Active Until on line 734 displays a time indicative of when the cycle will end.

Table 3 is an example of values of cycling parameters:

TABLE 3

| Cycling Parameters | Values |
| --- | --- |
| Current Energy Level | 1 (Medium) |
| Medium Cycle Rate | 75% |
| Cycle Period | 30 minutes |
| | (22.5 minutes restricted, |
| | 7.5 minutes unrestricted) |
| Cycle Length | Unlimited |
| Randomized start | On |

The cycling feature is independent of all temperature or other setbacks and may be either used independently, or in combination with temperature or other setbacks.

Although the user may override the default settings at any time, deviating from the programmed settings will usually cause the IT device 100 to allow the use of more energy. The benefits of the program 204 are best realized by allowing the IT device 100 to work using the programmed settings.

FIG. 8 illustrates an Energy Setbacks GPD 800 in accordance with one embodiment of the present invention. The Energy Setbacks GPD 800 displays the setbacks that correspond with each energy price level and corresponding price. In one embodiment, the user is allowed to change the medium and high energy setbacks.

The Energy Setbacks GPD 800 shows programmed setbacks for each energy level tier and the price per kilowatt hour (kWh) for energy used in each energy level tier. The Energy Setbacks GPD 800 includes a Energy Setbacks legend 802. The programmed setbacks include a Low Level Setback, Medium Level Setback, High Level Setback, and Critical Level Setback. Line 804 corresponds to the Low Level Setback and includes, a related legend, a temperature setback in degrees Fahrenheit (° F.) and a Low Level Setback energy price for a low level. Line 814 corresponds to a Medium Level Setback and includes a related legend, a temperature setback in degrees (° F.) and a Medium Level Setback energy price for a medium level. Line 824 corresponds to a High Level Setback and includes a related legend, a temperature setback in degrees (° F.) and a High Level Setback energy price for a high level. Line 834 corresponds to a Critical Level Setback and includes a related legend, a temperature setback in degrees (° F.) and a Critical Level Setback energy price.

At each level, the IT device 100 is configured to provide the user the ability to program in a "Setback," or number of degrees the IT device 100 will adjust the current temperature setting from the current temperature setpoint. The IT device 100 detects a change in the Setback Level based on the received real-time energy pricing from the Utility Company 330. For example, assume that the current temperature of the IT device 100 is set at 78° F. and the current energy price is associated with a Low or Medium Level Setback energy price. If a new received real-time energy pricing from the Utility Company 330 changes to a High Level energy price (i.e., $0.15/kWh), the IT device 100 is configured to automatically increment the current temperature setting by the number of Setback degrees (i.e., 6° F.). Thus the temperature setpoint automatically changes from 78° F. to 84° F. Alternatively, the Utility Company 330 could provide only the current energy pricing level (namely, low, medium, high or critical) without providing the actual pricing data, which would accomplish the same modification of the IT device 100 temperature setpoint.

The Energy Setbacks GPD 800 includes legends Cancel 840, OK 842 and Next 844 to cancel changes and return to the Home GPD 115, accept or select changes and to move to the next customizable item or cell, respectively, in the GPD 800. The legends "Cancel" 840, "OK" 842 and "Next" 844 are each associated with a respective one of the plurality of task controls 120. In lieu of selecting Next 844, the control wheel 130 may be pressed.

Figure 9:
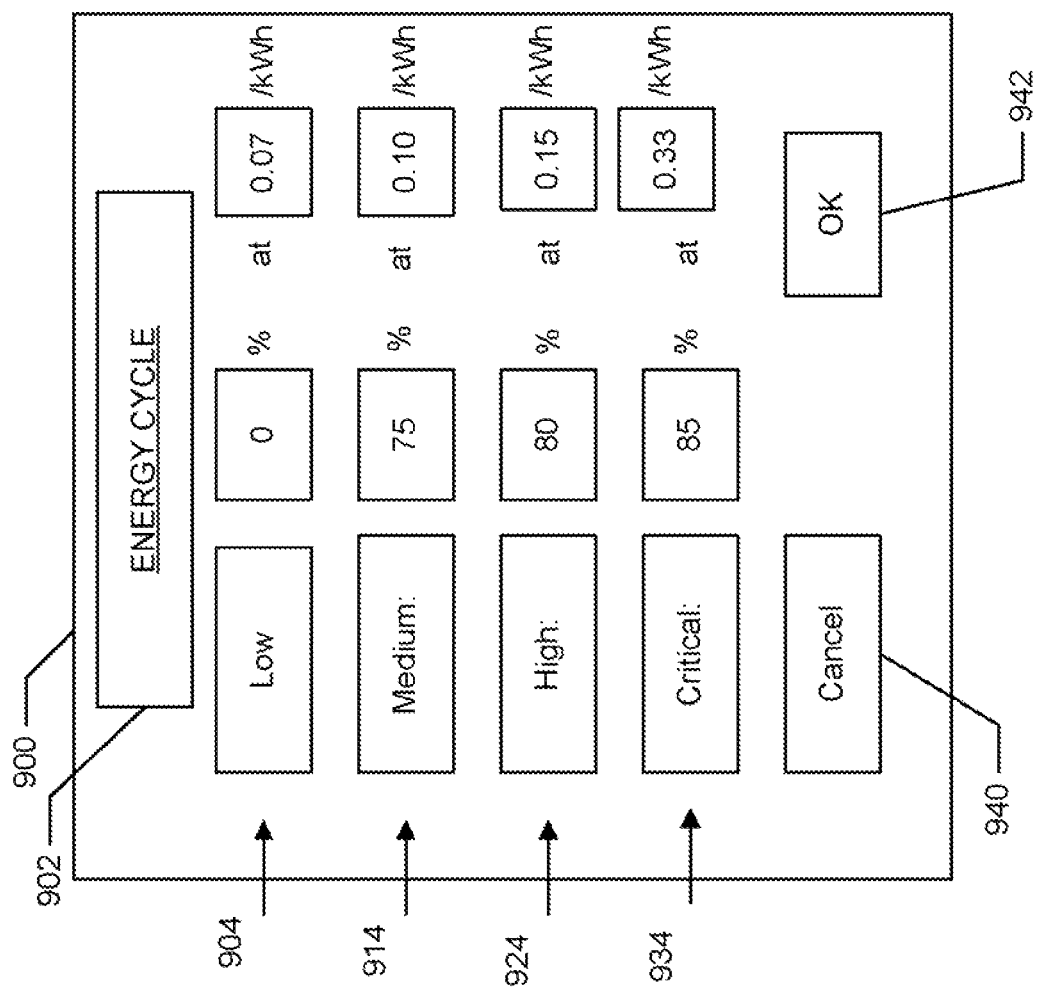
FIG. 9 illustrates an Energy Cycle GPD in accordance with one embodiment of the present invention.

FIG. 9 illustrates an Energy Cycle GPD 900 in accordance with one embodiment of the present invention. The Energy Cycle GPD 900 displays the programmed cycles for each level and the price per kilowatt hour for energy used in each level. The energy cycle GPD 900 further displays the cycle rates as it relates to the energy level tier. The user has the option of modifying the cycle rate values. In line 904, a Low Level Cycle is displayed which corresponds with the low cycle energy level and includes a cycle percentage (%) and a Low Level Cycle energy price. In one configuration, the Low Level Cycle energy price corresponds to the Low Level Setback energy price. In line 914, a Medium Level Cycle is displayed which corresponds with the medium cycle energy level and includes a cycle percentage (%) and a Medium Level Cycle energy price. In line 924, a High Level Cycle is displayed that corresponds with the high cycle energy level and includes a cycle percentage (%) and a High Level Cycle energy price. In line 934, a Critical Level Cycle is displayed that corresponds with the critical cycle energy level and includes a cycle percentage (%) and a Critical Level Cycle energy price. In the exemplary configuration, the Low Level Cycle is set to 0% and is associated with a Low Level Cycle energy price setting of $0.07/kWh. The Medium Level Cycle is set to 75% and is associated with a Medium Level Cycle energy price setting of $0.10/kWh. The High Level Cycle is set to 80% and is associated with a High Level Cycle energy price setting of $0.15/kWh. The Critical Level Cycle is set to 85% and is associated with a Critical Level Cycle energy price setting of $0.33/kWh. The Energy Cycle GPD 900 further displays legends "Cancel" 920 and "OK" 922 which are individually selectable via task controls 120. The legends Cancel 920 and OK 942 cancel changes and return to the Home GPD 115 and accept or select changes, respectively, in the GPD 800.

Figure 10:
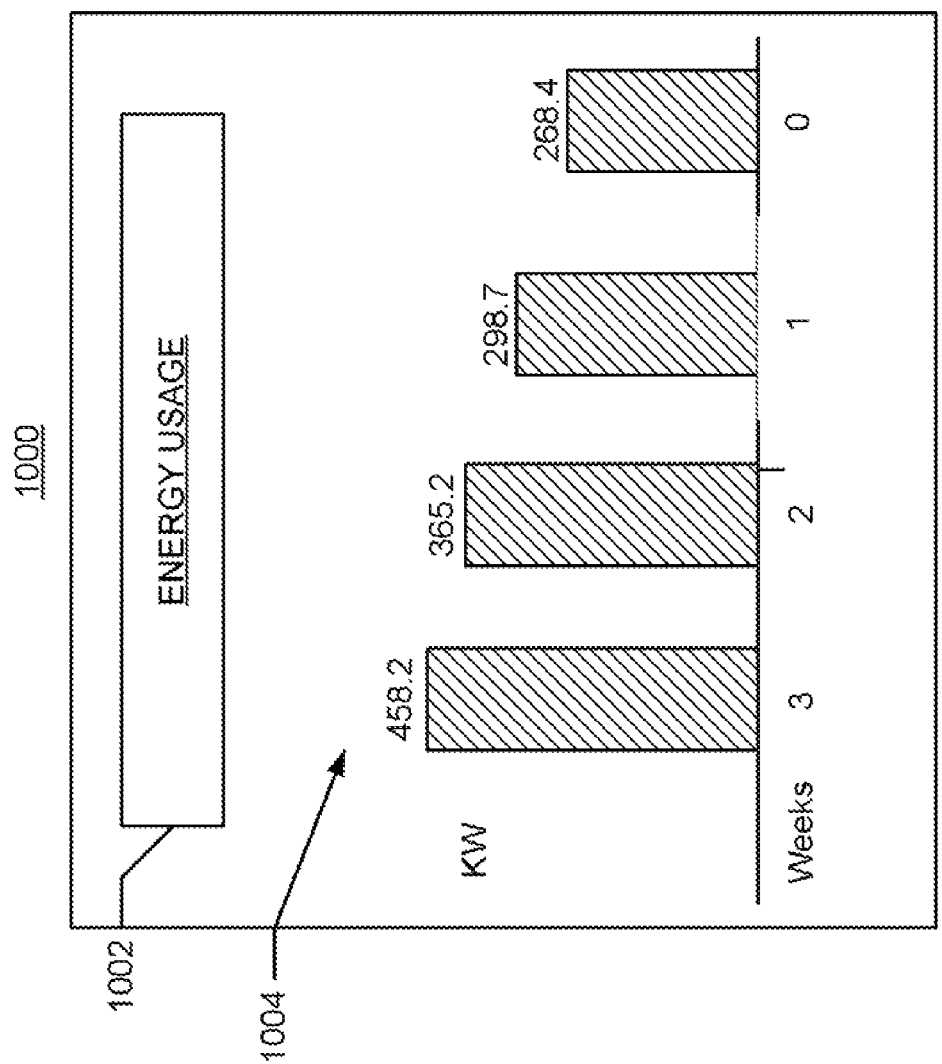
FIG. 10 illustrates an Energy Usage GPD in accordance with one embodiment of the present invention.

FIG. 10 illustrates an Energy Usage GPD 1000 in accordance with one embodiment of the present invention. The Energy Usage GPD 1000 displays a Energy Usage Legend 102 and a flexible energy usage graph 1004. The flexible energy usage graph 1004 includes a plurality of bars 0-3 corresponding to weeks 0-3. Each bar represents energy usage in Kilowatts for the current week (Week 0) and the three previous weeks (Weeks 1-3), respectively.

Figure 14:
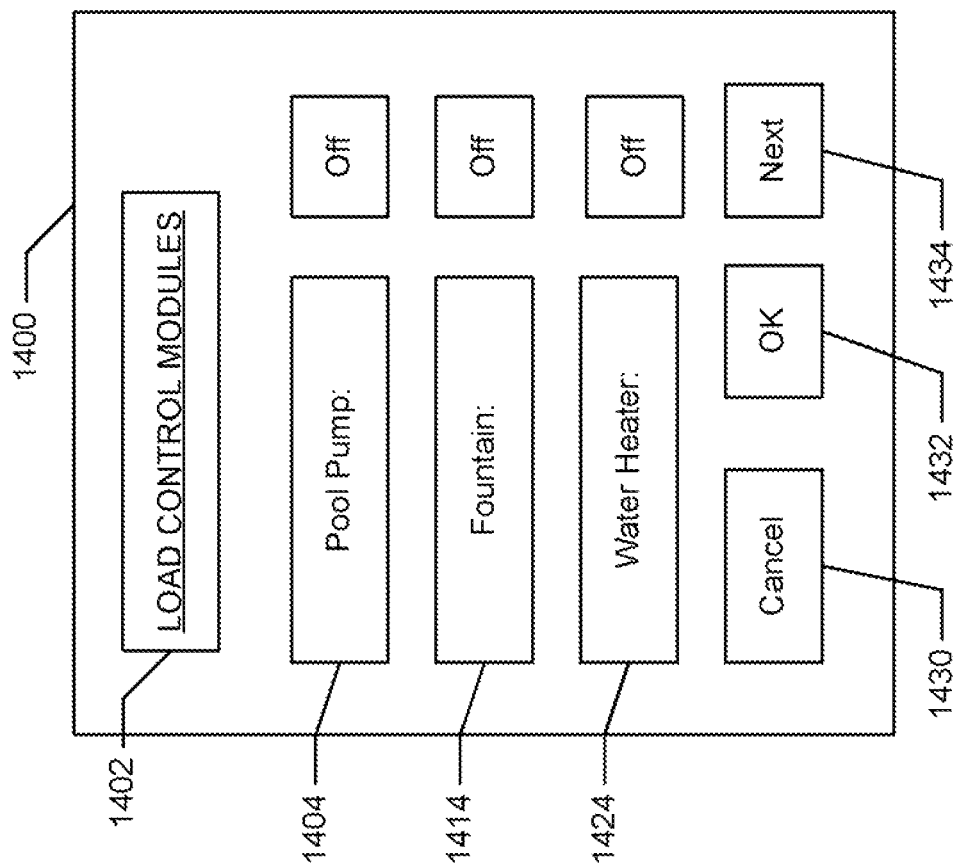
FIG. 14 illustrates a Load Control Modules GPD in accordance with one embodiment of the present invention.

FIG. 14 illustrates Load Control Modules GPD 1400 in accordance with one embodiment of the present invention. The Load Control Modules GPD 1400 includes a legend "Load Control Modules" 1402. The Load Control Modules GPD 1400 displays to the user added energy loads fed through the Utility Meter 320. The Load Control Modules GPD 1400 lists one or more added energy loads and allows the user to selectively turn off or on any one of the added energy loads via the IT device 100.

The Load Control Modules GPD 1400 includes on each line a legend for a particular added energy load and a selectable status indicator that indicates whether the added energy load is On or Off. Selecting the status indicator allows the operation to be toggled from Off to On or On to Off. Generally, the particular load is an added element requiring energy from the Utility Meter 320. Hence, turning Off a load would reduce energy consumption. In this example, on line 1404 a pool pump is shown with a status indication that the pool pump is Off. On line 1414, a fountain is shown with a status indication that the fountain is Off. On line 1424, a water heater is shown with a status indication that the water heater is Off. The Load Control Modules GPD 1400 further includes legends Cancel 1430, OK 1432 and Next 1434 which are individually selectable using the plurality of task controls 120. The operations of Cancel 1430, OK 1432 and Next 1434 are similar to the Cancel, OK and Next described in relation to at least FIG. 8.

The legends of the Load Control Modules GPD 1400 displays a custom text label for the added load control modules. Toggling the status indicator allows the user to selectively turn On or Off any one of the selected loads. In practice, an added energy load, as discussed above, can be a discrete device or appliance, or can be an entire electrical circuit which provides power to multiple devices or appliances. In one embodiment, selected loads are disconnected from the electrical grid via Load Interface Units 1500, described below.

FIG. 15 illustrates a block diagram of an Load Interface Unit 1500 for load balance and control in accordance with one embodiment of the present invention. The Load Interface Unit 1500 includes an interface module 1502 configured to communicate with one or more of transceiver (T/R) 320, IT device 100 and home automation network 315. The interface module 1502 is configured to receive control signals to turn On or Off the load coupled to the interface module 1502. For example, the Utility Company 330 may turn Off (shed) one or more of the loads (via, for example, the communication link between the Utility Meter 320 and the Load Interface Unit 1500) as part of a load shedding program. If a status of a load is changed by the Utility Company 330, the Load Control Modules GPD 1400 would still display the new current status of said load. Likewise, any homeowner could, for example, turn Off (shed) one or more loads remotely (for example, through the Internet) via a connection between a Home Automation Network 315, an IT device 100 (and therethrough to the Load Interface Unit 1500).

The interface module 1500 includes a light emitting diode (LED) 1508 to indicate whether the interface module 1500 is On or Off. The interface module 1500 is also coupled to a magnetic switch 1510, an override relay 1504 and a universal power supply 1508. The magnetic switch 1510 may be used to allow the interface module 1502 to be selectively programmed. For example, passing a magnetic device near the magnetic switch 1510 toggles the magnetic switch 1510 so that the interface module 1502 may be place in a programming mode. The override relay provides 30 amps and is coupled between the load (i.e., pool pump, fountain, water heater) and the interface module 1502. A universal power supply 1506 is provided between the line to the override relay 1504 and the interface module 1502. The universal power supply 1506 further includes a neutral input.

Figure 16:
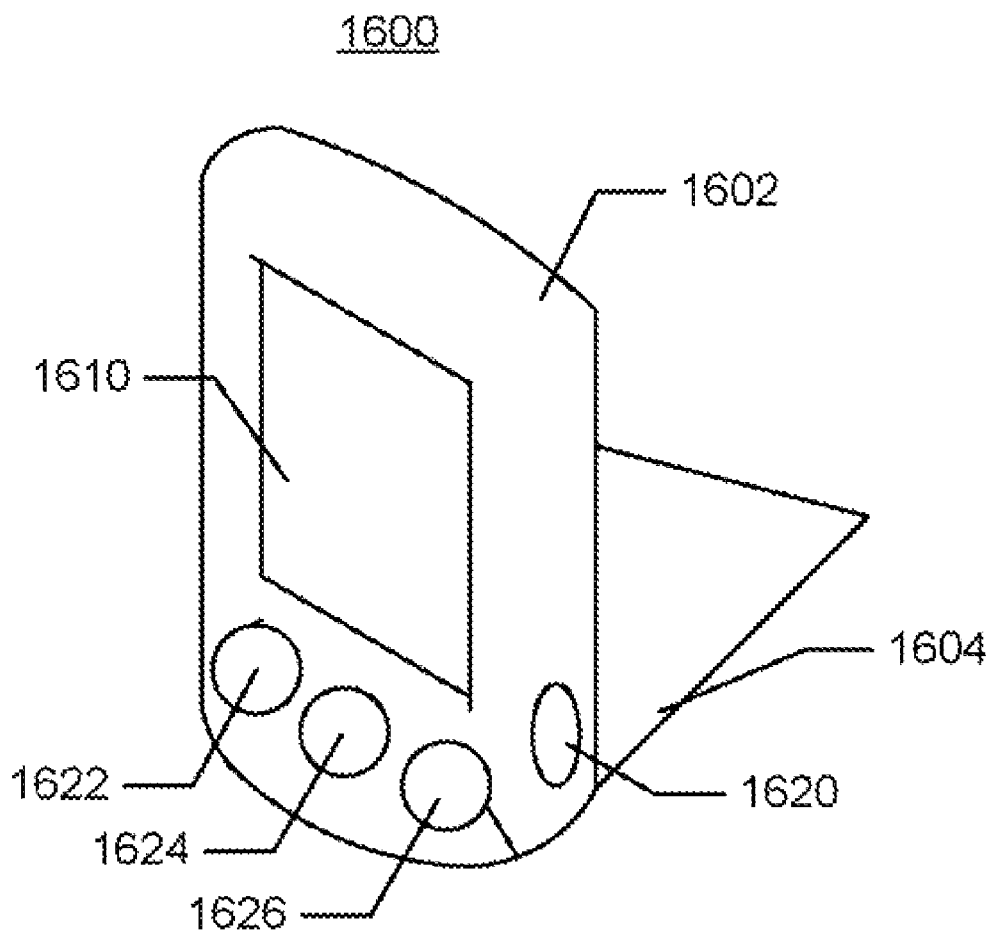
FIG. 16 illustrates a Mobile Intelligent Thermostat (MIT) device in accordance with one embodiment of the present invention.

FIG. 16 illustrates a Mobile Intelligent Thermostat (MIT) device 1600 in accordance with one embodiment of the present invention. The MIT device 1600 functions in a manner similar to the IT device 100. The MIT device 1600 includes a device housing 1602 having a surface support 1604 that supports the device housing 1602 on a horizontal surface such as a table top or desk. The MIT device 1600 further includes a display 1610 and a plurality of task controls 1622, 1624 and 1626. The surface support 1604 is configured to pivot about pivot 1620 to orient the device housing 1602 at a particular angle. One way that the MIT device 1600 differs from the IT device 100 is that the control wheel has been omitted; however, the omission of said control wheel is not required.

The MIT device 1600 would have a battery source within the device housing 1602 to power the electronics therein. The MIT device 1600 communicates with the outdoor sensors 350, HVAC system 305, Load Interface Units 350, transceiver 325 and home automation network 315 using wireless communication techniques.

Figure 17:
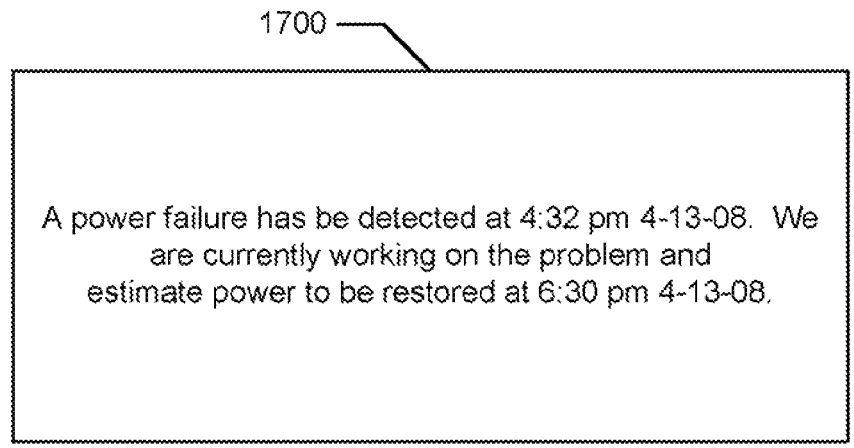
FIG. 17 illustrates a Power Failure Notification in accordance with one embodiment of the present invention.

FIG. 17 illustrates a Power Failure Notification 1700 in accordance with one embodiment of the present invention. The Power Failure Notification 1700 is a message from the Utility Company 330 indicating that a power failure is detected. The Utility Company 330 may further indicate the time and date of the detected power failure and an estimated restoration time and date.

Figure 18:
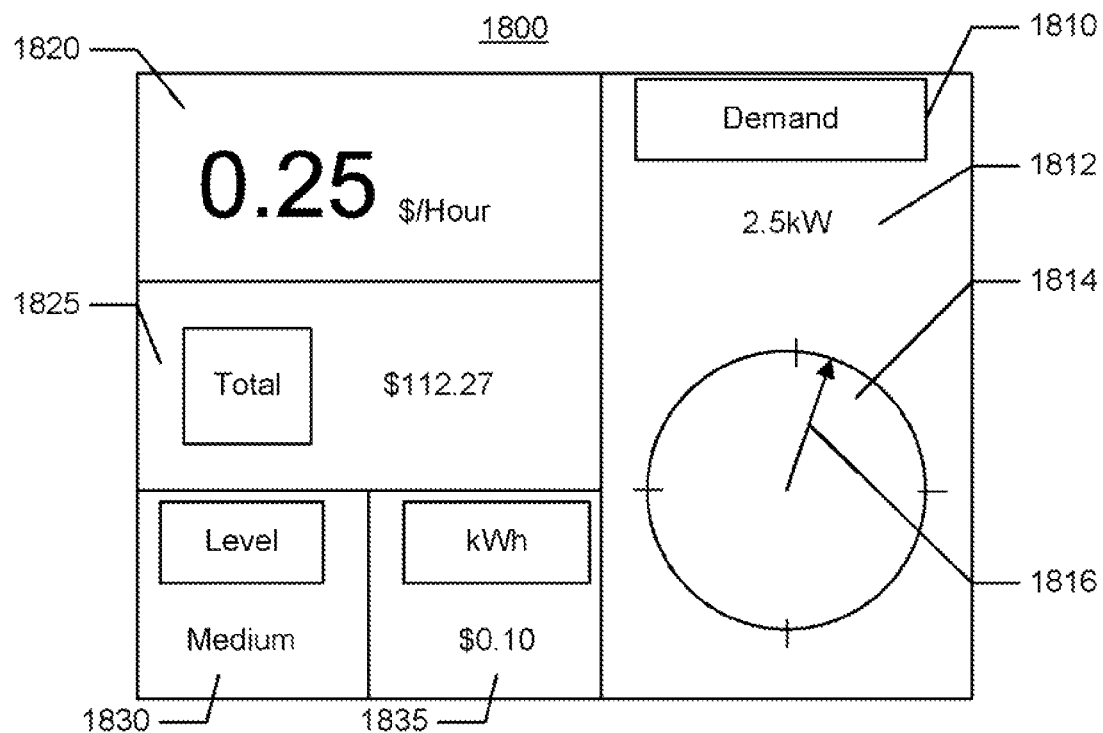
FIG. 18 illustrates a Current Energy Demand GPD in accordance with one embodiment of the present invention.

FIG. 18 illustrates a Current Energy Demand GPD 1800 in accordance with one embodiment of the present invention. The energy demand details on the Current Energy Demand GPD 1800 displays a legend Demand 1810 for the current home, office or building demand (2.5 kW) 1812 and related cost 1820. In one configuration, below the related cost 1820, a simulated Utility Meter 1814 is displayed. The arrow or meter hand 1816 will be incrementally updated or rotated 360° around the simulated Utility Meter 1814, denoted as a circle.

The energy demand details on the Current Energy Demand GPD 1800 further includes an indication of the energy cost for an hour in the area denoted by 1820. In area 1825 below area 1820, a legend "Total" is displayed with an associated dollar value corresponding to a sum total of energy cost as measured by the Utility Meter 320 for a predetermined period. The predetermined period may be synchronized to a billing cycle by the Utility Company 330. Nonetheless, other periods of accumulation may be used such as Weekly, Daily, Monthly, etc. After the predetermined period, the sum total of energy cost in the area 1825 would be reset to $0.00.

In area 1830, a legend "Level" is displayed with an associated current energy price level (Medium). The current energy price level is determined by the IT device 100 based on the real-time energy cost, displayed in area 1835, from the Utility Company 330. In this example, the energy cost of $0.10/kWh corresponds to the Medium Level.

Figure 19:
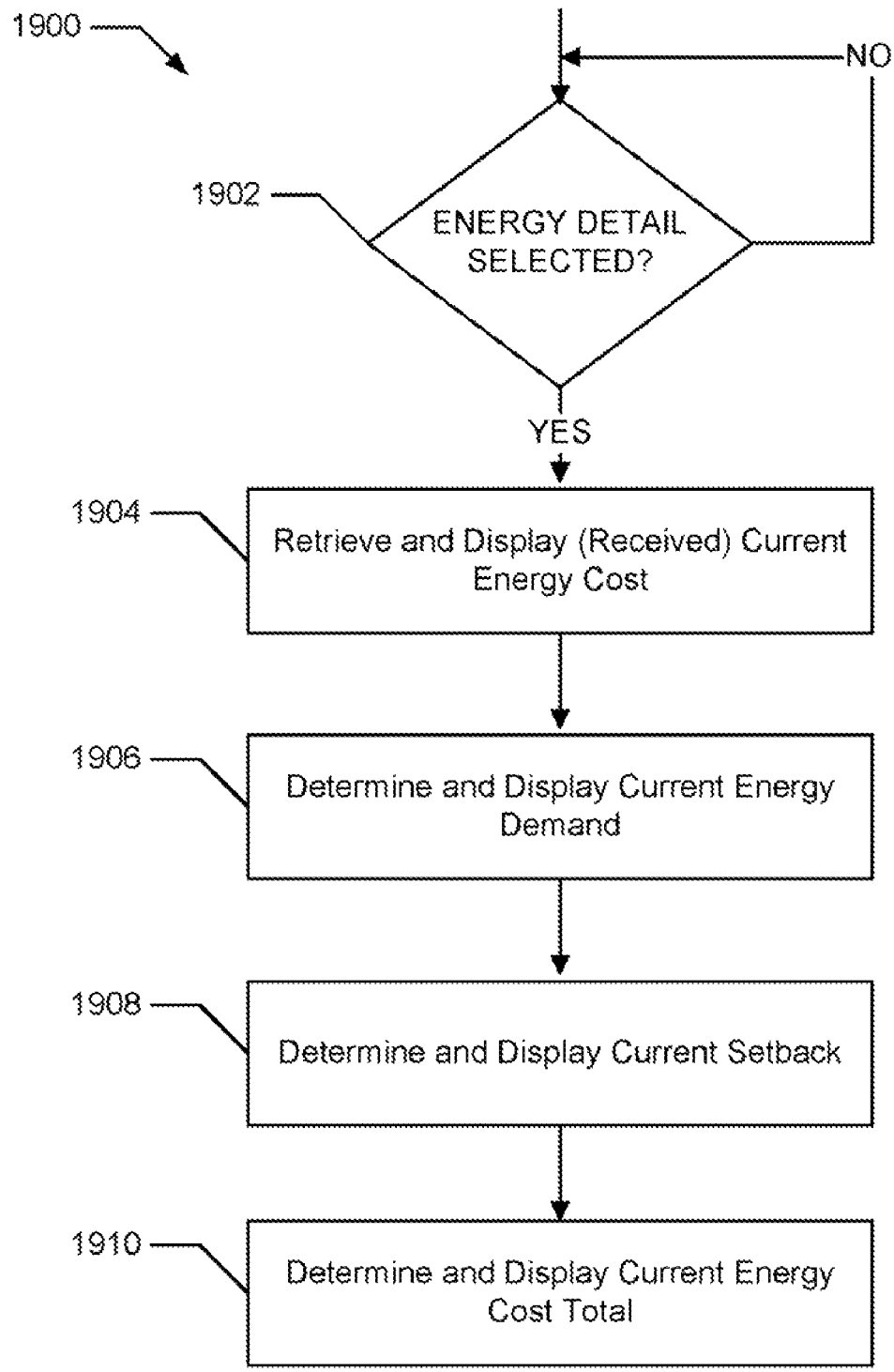
FIG. 19 illustrates a flowchart of a process to display the Energy Detail GPD in accordance with one embodiment of the present invention.

FIG. 19 illustrates a flowchart of a process 1900 to display the Energy Detail GPD in accordance with one embodiment of the present invention. The process 1900 begins with a determination that the user has selected to display the Energy Detail GPD 600. If the determination is NO at step 1902, the process 1900 loops back to the beginning of step 1902. If the determination at step 1902 is YES, then step 1902 is followed by step 1904 where the received current energy cost is retrieved and displayed. At step 1906, the current energy demand is determined and displayed. At step 1908, the current setback is determined based on the current energy cost and displayed. At step 1910, the current energy cost total is determined and displayed.

FIG. 20 illustrates a flowchart of a process 2000 to customize a Energy Management Message Bar (EMMB) field 150 in accordance with one embodiment of the present invention. The process 200 begins with step 2002 where a determination that messages (See FIG. 4) and, more particularly, the messages for the EMMB field 150 are to be set up or customized. If the determination at step 2002 is NO, the process 2000 loops back to the beginning of step 2002. However, if the determination is YES, then step 2002 is followed by step 2004 where a list of customizable scrolling messages is displayed. The list may include date and time, energy status, outdoor status, filter reminder and energy messages.

Step 2004 is followed by step 2006 where a determination is made whether the selection is complete. If the determination is NO, then the process loops to the beginning of step 2006. If the determination is YES, then step 2006 is followed by step 2008 where the selected messages for scrolling in the EMMB field 150 are updated.

Figure 21:
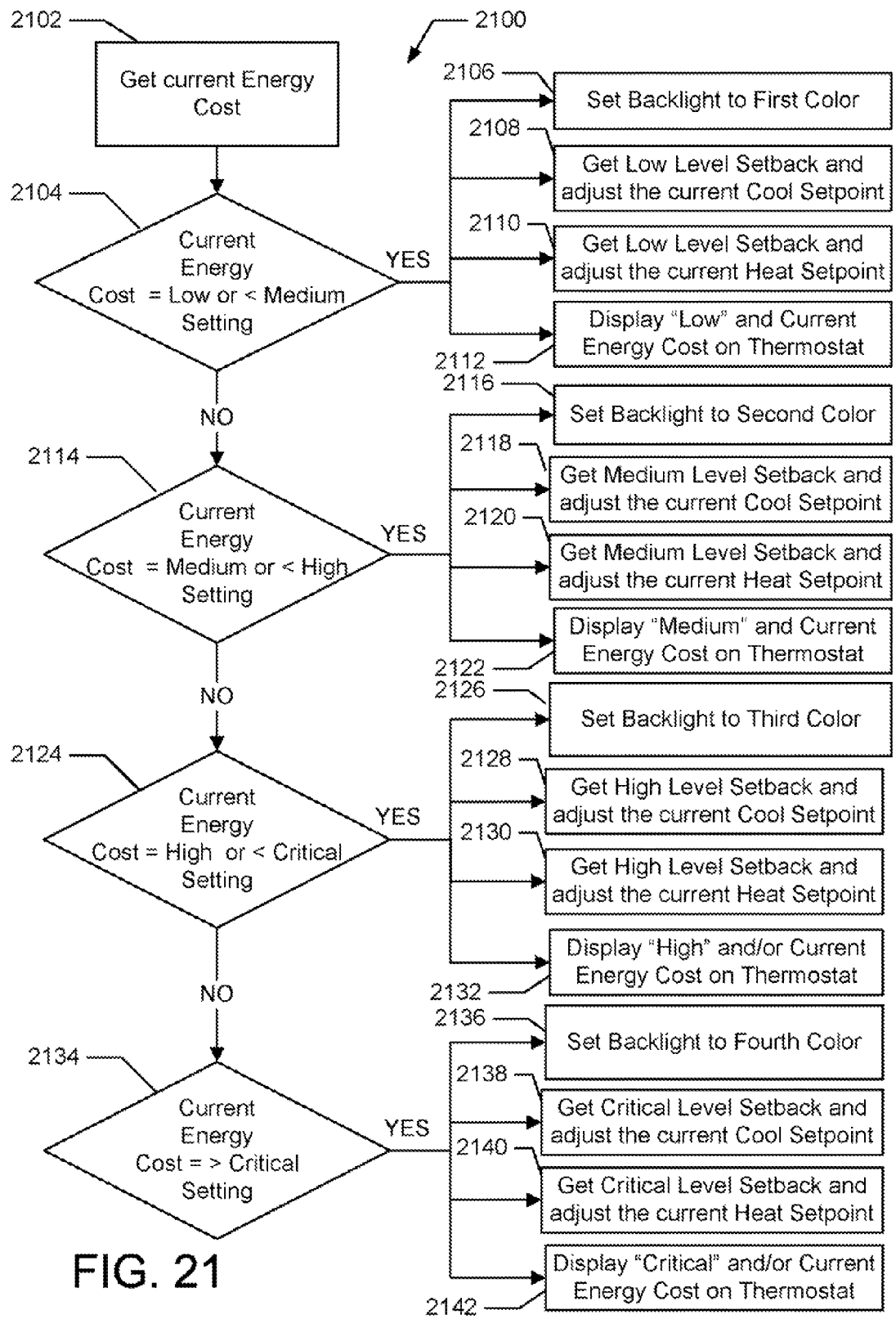
FIG. 21 illustrates a flowchart of a process which controls the IT device based on the current energy price in accordance with one embodiment of the present invention.

FIG. 21 illustrates a flowchart of a process 2100 for controlling the IT device 100 based on the current energy price in accordance with one embodiment of the present invention. The process 2100 begins with receiving the current energy cost from the Utility Company 330 at step 2102. Step 2102 is followed by step 2104 where the current energy cost is compared to the currently programmed (whether default or customized) Energy Level Settings, such as shown in FIG. 8 or 9, to determine the current Energy Level. At step 2104, the current energy price is evaluated to determine if the energy cost or price is equal to the Low Energy Level Setting but less then the Medium Energy Level Setting. If the determination is YES at step 2104, then step 2104 is followed by steps 2106, 2108, 2110 and 2112. At step 2106, the backlight is set to a first or default color. At step 2108, the Low Level Setback is retrieved and the current Cool setpoint (temperature setting) is adjusted according to the Setback. In the exemplary configuration, the Low Level Setback is 0° F. In one configuration, all the Setbacks may be customized. At step 2110, the Heat setpoint is obtained and the current Heat setpoint is adjusted according to the Setback. At step 2112, assuming the Home GPD 115 is displayed, the message in the EMMB field 150 is updated with the current Energy Level and related cost.

If the determination at step 2104 is NO, then step 2104 is followed by step 2114. At step 2114, the current energy price is evaluated to determine if the energy cost or price is equal to the Medium Energy Level Setting but less then the High Energy Level Setting. If the determination is YES at step 2114, then step 2114 is followed by steps 2116, 2118, 2120 and 2122. At step 2116, the backlight is set to a second color. At step 2118, the Medium Level Setback is retrieved and the current Cool setpoint (temperature setting) is adjusted according to the Setback. In the exemplary configuration, the Medium Level Setback is 0° F. In one configuration, all the Setbacks may be customized. At step 2120, the Heat setpoint is obtained and the current Heat setpoint is adjusted according to the Setback. At step 2122, assuming the Home GPD 115 is displayed, the message in the EMMB field 150 is updated with the current Energy Level and related cost.

If the determination at step 2114 is NO, then step 2114 is followed by step 2124. At step 2124, the current energy price is evaluated to determine if the energy cost or price is equal to the High Energy Level Setting but less then the Critical Energy Level Setting. If the determination is YES at step 2124, then step 2124 is followed by steps 2126, 2128, 2130 and 2132. At step 2126, the backlight is set to a third color. At step 2118, the High Level Setback is retrieved and the current Cool setpoint (temperature setting) is adjusted according to the Setback. In the exemplary configuration, the High Level Setback is 6° F. At step 2130, the Heat setpoint is obtained and the current Heat setpoint is adjusted according to the Setback. At step 2132, assuming the Home GPD 115 is displayed, the message in the EMMB field 150 is updated with the current Energy Level and related cost.

If the determination at step 2124 is NO, then step 2124 is followed by step 2134. At step 2134, the current energy price is evaluated to determine if the energy cost or price is equal to or greater than the Critical Energy Level Setting. If the determination is YES at step 2134, then step 2134 is followed by steps 2136, 2138, 2140 and 2142. At step 2136, the backlight is set to a fourth color. At step 2138, the Critical Level Setback is retrieved and the current Cool setpoint (temperature setting) is adjusted according to the Setback. In the exemplary configuration, the Critical Level Setback is 13° F. In one configuration, all the Setbacks may be customized. At step 2140, the Heat setpoint is obtained and the current Heat setpoint is adjusted according to the Setback. At step 2142, assuming the Home GPD 115 is displayed, the message in the EMMB field 150 is updated with the current Energy Level and related cost.

Figure 22A:
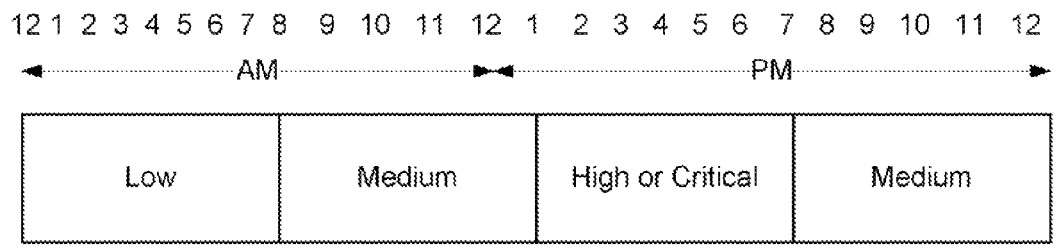
FIGS. 22A-22D illustrate exemplary seasonal energy level profiles, implemented via received or programmed energy levels, for determining the current energy pricing in accordance with one embodiment of the present invention.
Figure 22B:
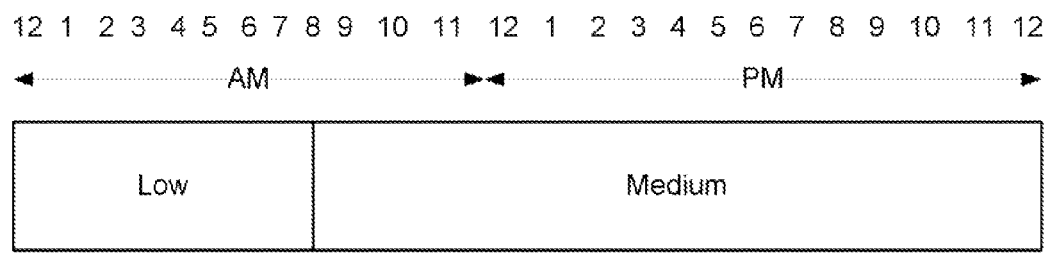
Figure 22C:
Figure 22D:
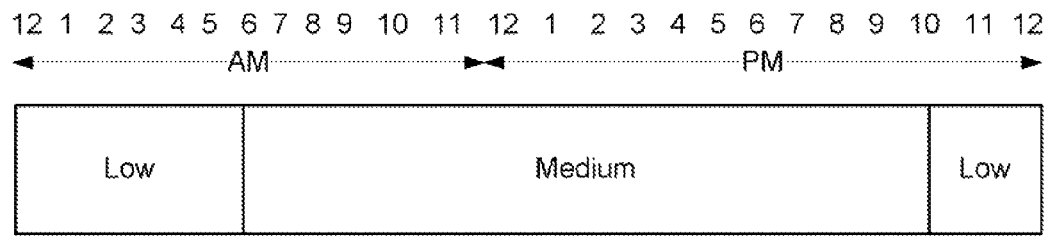

FIGS. 22A-22D illustrate examples of seasonal profiles demonstrating received or programmed energy levels for determining the current energy pricing in accordance with one embodiment of the present invention. FIG. 22A is an example of energy levels (or associated energy cost) partitioned into scheduled hours for Summer weekdays. FIG. 22B is an example of energy levels (or associated energy cost) partitioned into scheduled hours for Summer weekends. FIG. 22C is an example of energy levels (or associated energy cost) partitioned into scheduled hours for Winter weekdays. FIG. 22D is an example of energy levels (or associated energy cost) partitioned into scheduled hours for Winter weekends. These four examples demonstrate how a Utility might adjust the price of energy during a given day in these exemplary seasonal time periods, thereby demonstrating times of day where cost savings may be realized via real-time price based temperature setbacks.

FIG. 23 illustrates an Energy Options GPD 2300 in accordance with one embodiment of the present invention. The Energy Options GPD 2300 allows a Fan Cycle Option to be selectively turned On or Off. The Fan Cycle Option is used to allow the fan to come on to circulate the air during the restricted portion of a cycle period (namely, the time when all climate control, such as HVAC or heating, is disabled). The fan will only come on when the IT device 100 is in a Cool mode.

The cycling feature is independent of all Energy Level Setbacks and may be used either independently, or in combination with, the Energy Level Setbacks described above. The cycling feature may be disabled according to factory defaults and may be enabled remotely such as from the Utility Company 330. Thus, the cycling feature allows energy load shedding to be controlled. The cycling feature is an alternate way for controlling a HVAC system's energy demand. When the cycling feature is enabled, the HVAC system 305 will be in a customizable duty cycle. The customizable duty cycle will enforce a period of time that the HVAC system 305 will be disabled. The goal, from the Utility Company's (330) perspective, is to have each HVAC system 305 in a home, office or building functioning under a slightly different cycle so that a percentage of HVAC systems are always off at any specific time. The goal from a customer/consumer perspective to provide yet another method of limiting the use of energy and thereby lowering overall energy costs.

Nevertheless, the HVAC system 305 will always obey the pre-programmed minimum on and off times in an effort to protect the compressor.

The cycling feature can either be controlled by the real-time, current energy level or by one specific rate (see FIGS. 7 & 9). Cycling is set by duty cycle (0-80%), period (15-60 minutes), and cycle duration (15-1270 minutes), if applicable. The cycling feature also has an option for randomized start and an option to turn on the fan during disabled times (See FIG. 23). The cycling options register (245) is controlled by individual bits to enable (1) or disable (0) the individual features. It should be noted that the registers for the cycling feature are shown in Table 9 below.

When the cycling feature is controlled by the energy level, all three energy cycle rates (registers 240-242) must be initialized with proper values. As the energy levels change, the cycling rate will change with the corresponding value. The user will be able to adjust these rates via the energy cycle page (FIG. 9). When the cycling feature is controlled by one specific rate, only the medium cycle rate (register 240), must be set to a proper value as said rate will be the controlling rate. The Energy level (register 169), must then be set to a value of 100 to enable cycling operation.

The cycling feature employs an optional timer (register 244) that will disable all cycling when the timer (register 244) expires. The timer is valid from 15-1270 minutes, in 5 minute increments. This timer can be used for cycling with energy levels or cycling with one rate. When the timer counts down to 0, the timer essentially sets the energy level to 0 or Low (if in energy level mode), or disables all AC or heating systems (if in one rate mode).

If the Fan control is set to bit 0, the fan is controlled to come on during the disabled portion of the cycle. If the Randomization is selected (bit 1), when an energy level change or cycling rate change has been issued, it will likely be reached by many HVAC systems around the same time.

Figure 24:
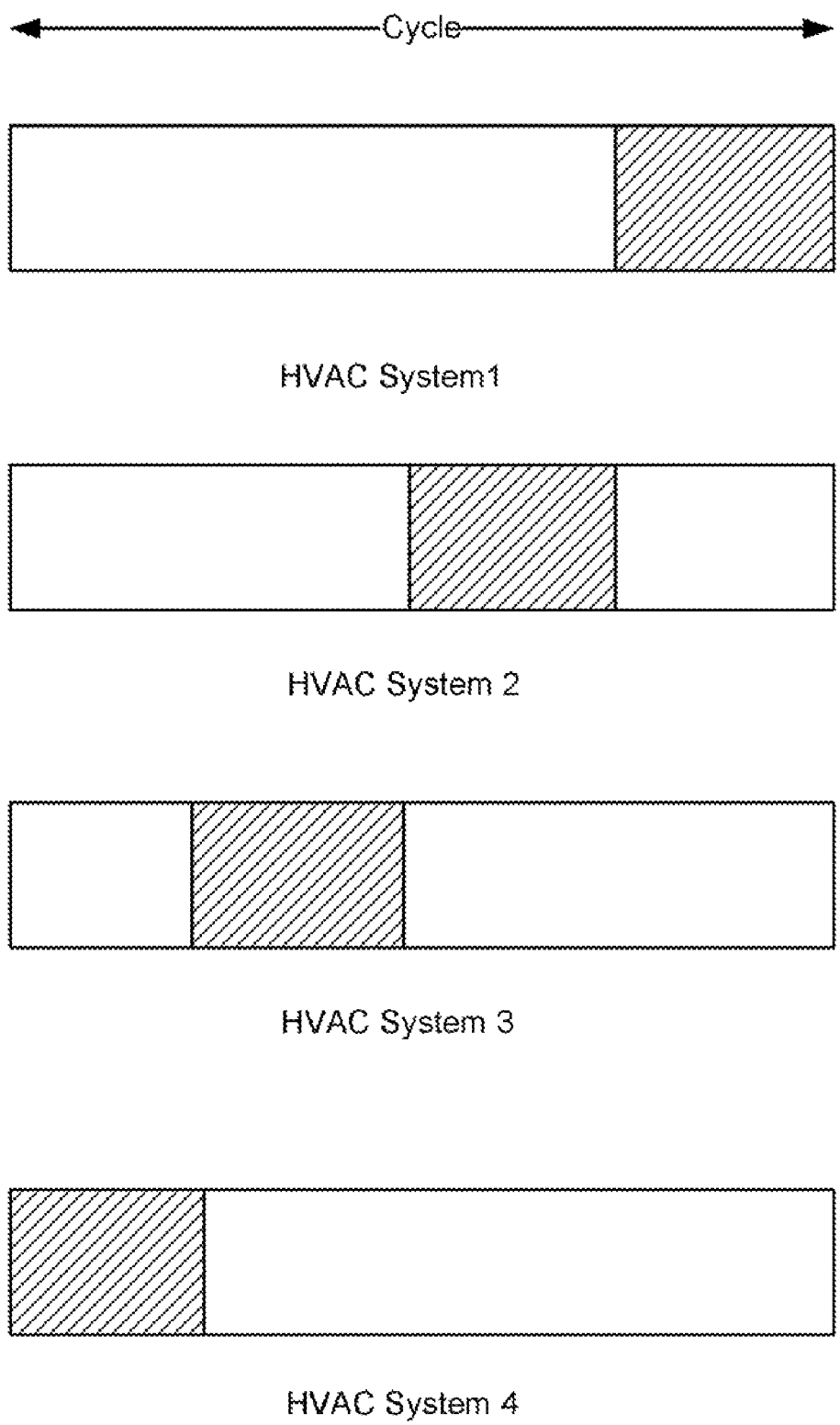
FIG. 24 illustrates the disabled and enabled periods for a plurality of HVAC systems during a cycling period.

FIG. 24 illustrates the disabled (shown hatched) and enabled periods (shown with no hatching) for a plurality of HVAC systems 1, 2, 3 and 4 during a given cycling period. If there is a need to stagger the cycling rates in an environment with multiple HVAC systems, randomization will occur in the first cycle. This will ensure that each of the plurality of HVAC system starts on a random part of the first cycle. The disabled periods may be non-overlapping between the HVAC systems.

Cycling parameters may be viewed and changed from Energy Details GPD 600, Energy Cycling Details GPD 700, Energy Cycle GPD 900, and Energy Options GPD 2300, previously described. During an energy cycle disable period, the EMMB field 150, if selected, will display "Energy Disabled" when the energy is disable to the HVAC system 305 and may optionally display the time left in the disable portion of the current cycle period.

In one configuration, the cycle registers may be changed remotely. Register 240 corresponds to a Medium Cycle Rate (0-80%); Register 241 corresponds to a High Cycle Rate (0-80%); Register 242 corresponds to a Critical Cycle Rate (0-80%); Register 243 corresponds to an Energy Cycle Period (15-60 minutes); Register 244 corresponds to an Energy Time Remaining (15-1270 minutes, in 5 minute increments); Register 245 corresponds to an Energy Options (bit 0—Fan on(1)/off(0) when in energy cycle; bit 1 for Random startup (1)).

The serial communications protocol of the IT device 100 will now be described. The IT device 100 is operable to communicate in several communications modes. For example, there is a RS-232 mode and a System mode. These differ in electrical connections and transmission speed. The messages, however, are the same for both modes.

Figure 25:
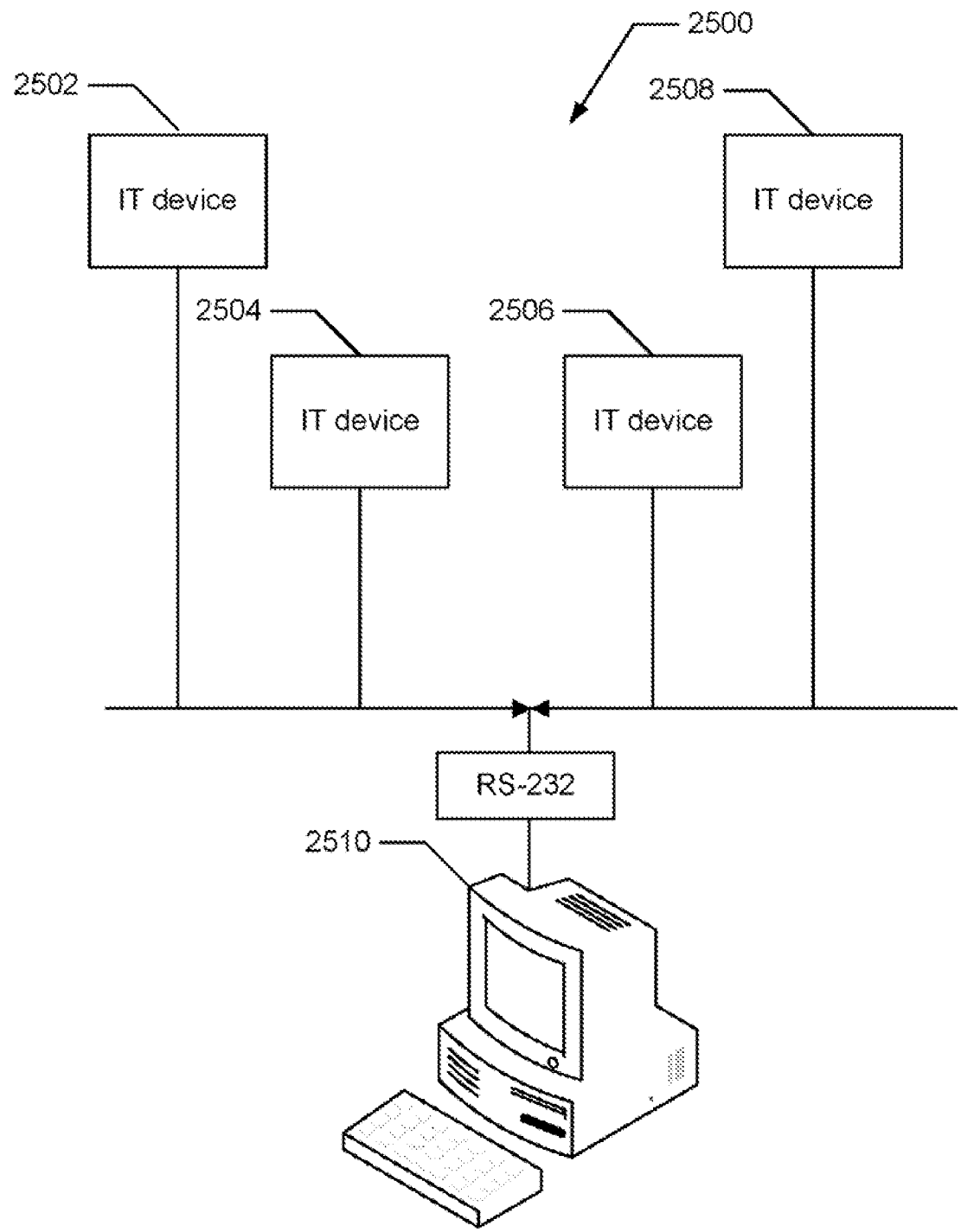
FIG. 25 illustrates a home automation system 2500 with multiple IT devices in accordance with one embodiment of the present invention.

FIG. 25 illustrates a home automation system 2500 with multiple IT devices 2502, 2504, 2506 and 2508 coupled to a PC (or other host) 2510 via a RS-232 connection. In the RS-232 mode, the IT device 2502, 2504, 2506 or 2508 are configured for connection to hosts 2510 or other systems with RS-232 ports. There are four wires to each IT device 2502, 2504, 2506 and 2508 which include DTR, RXD, TXD and Ground, as will be described in more detail below. All wires may be optically isolated a given IT device. An IT device transmits with a modified RS-232 transmitter that can have a tri-state (high impedance) so that more than one IT device can be connected in parallel to a single RS-232 port.

In the RS-232 mode, the transmitted RS-232 voltage levels are generated by using the DTR wire as a source for +12 volts when transmitting a space (0 bit) and the received RS-232 signal as a source for −12 volts when transmitting a mark (1 bit). Therefore, the DTR wire must be set high at all times by the host or PC 2510, and the host or PC 2510 must not transmit while a respective one IT device is transmitting.

A typical RS-232 port on a personal computer (PC) can drive four (4) IT devices 2502, 2504, 2506 and 2508 directly using a RC-201 cable. A signal booster (i.e., RC-202) is needed to increase the output current of the RS-232 port for more than four IT devices. Wiring for additional thermostats can be home run or daisy chained, or a combination of both.

In the System mode, an IT device is configured for connection to automation systems that do not have RS-232 voltage levels. In this configuration, three (3) wires TXD, RXD, and GND in an IT device are used. The communications wires are optically isolated from the HVAC circuits in an IT device. RXD is 0 V when the host is sending a mark (bit 1) or idle, 12 V when host is transmitting a space (bit 0). The TXD is an open collector optoisolator, open when idle or transmitting a mark (bit 1) or conducting to GND when transmitting a space (bit 0.)

In the RS-232 mode, the current drawn by an IT device receiver is shown in Table 4.

TABLE 4

| | |
|---|---|
| RS-232 receive space (bit 0): | 2.0 mA at 12 V |
| RS-232 receive mark (bit 1) transmitter idle: | 0.0 mA at −12 V |
| transmitter active: | −4 ma max at −12 V |

For a IT device transmitter, the IT device will provide the current and voltages shown in Table 5. Note that +12 V is drawn from DTR, and −12 V is drawn from the thermostat receive line (TXD) while it is idle.

TABLE 5

| | |
|---|---|
| tri state: (off): | open collector, 0 mA |
| RS-232 transmit space (bit 0): | 10 V at 4 mA |
| RS-232 transmit mark (bit 1): | 10 V at −4 mA |

The current and voltage levels are compatible with RS-232 communication standards.

In the System mode, the current and voltages for the IT device receiver is shown in Table 6.

TABLE 6

| | |
|---|---|
| System mode receive space (bit 0) : | 1.0 mA at 12 V |
| System mode receive mark (bit 1): | 0.0 mA at 0 V |

In the System mode, the current and voltages for the IT device transmitter is shown in Table 7.

TABLE 7

| | |
|---|---|
| tri state: (off): | open collector, 0 mA |
| System mode transmit space (bit 0): | 2 V maximum at 4 mA |
| System mode transmit mark (bit 1): | open collector, 0 mA |

An IT device will respond to properly formatted messages from a polling device. An IT device does not initiate messages. The protocol is half-duplex, meaning that an IT device does not receive while it is transmitting. The host or PC 2510 must not transmit while an IT device is transmitting. In one configuration, the byte format includes 1 start bit, 8 data bits, 1 stop bit, and no parity. The least significant bit (LSB) is transmitted first. An IT device supports a plurality of data rates which include 100, 300, 1200, 2400, and 9600 baud. The Message Format is shown in Table 8.

TABLE 8

| Message Byte | Description |
|---|---|
| Byte 1 | Start/Remote Address |
| Bit 0-6 | Remote address (0-127, 0 = broadcast, 250 = universal address) |
| Bit 7 | 1 - for thermostat reply 0 - for host message |
| Byte 2 | Data Length/Message type |
| Bits 3-0: | Message Type (0-15) |
| Bits 7-4: | Data Length (0-15), invalid for ASCII strings. |
| Bytes 3-n: | Data 0 to 15 bytes |
| Byte n+1: | checksum (add bytes 1-N to get checksum) |

The host or PC 2510 initiates polls. The host or PC 2510 may not poll while an IT device is transmitting. An IT device will reply to a poll with a response. An IT device does not reply to broadcast messages (remote address 0). An IT device may respond to an address (250). An IT device will not take action on, nor reply to a message with an invalid checksum byte. If an IT device does not reply, the host or PC 2510 should try again after an intermessage timeout.

An Intermessage (between messages) timeout may be set to expire in 1.25 seconds. If an IT device does not reply, the host or PC 2510 should wait a minimum of 1.25 seconds after the end of the host's transmission to retry the message. An Intramessage (within messages) timeout may be set to expire in 500 ms. There should be no gaps longer than 500 ms between bytes of a message.

An IT device takes a maximum of 30 ms to set a register. The registers are shown in Table 9. When setting registers, an IT device will reply after it has written the registers to its internal EEPROM in memory 202. For example, the setting 206 includes the registers shown in Table 9. The host or PC 2510 may transmit another message immediately after an IT device completes its reply. If setting registers with a broadcast message, an IT device will not reply, and will not enable its receiver until after the host or PC 2510 has written all registers. Therefore, when using a broadcast message, the host or PC 2510 must wait at least 30 ms per register set before starting any subsequent message. A worst case example is to send a broadcast message that sets 14 registers. The host or PC 2510 may wait 14*30 ms=420 ms before sending any other message.

An IT device supports error handling and bit timing. If a framing error occurs (no start or stop bit where one was expected) or an incorrect checksum is detected, an IT device ignores the remainder of the message. An IT device will continue to receive and ignore bytes until an intramessage timeout occurs.

The center of each bit of the reply occurs at integer intervals of the beginning of the start bit of the last byte in the message that caused the reply. An IT device requires anywhere from 0 to 420 ms to format a reply and begin sending it. Therefore, a reply could begin anywhere from 0.5 to 42.5 bit times after the end of the stop bit of the message that caused the reply at 100 baud. However, the reply will always start on 0.5 bit time intervals (1.5, 3.5, etc.). It should be noted that the bit timing should be compatible with all PC serial ports, and any other port with a hardware Universal Asynchronous Receiver Transmitter (UART). The bit timing should also allow communications with a software UART using input/output pins, because the bits of the reply are synchronized with the transmitter's bit clock.

The Host-to-IT device communication protocol has a plurality of message types. The host or PC 2510 may poll for register(s). The poll for register(s) message requests from one to 14 registers to be returned in a Data message. An IT device will reply with the data or a negative acknowledge. In a another message the Host or PC 2510 sets register(s). The set register(s) message tells an IT device to set one to 14 consecutive registers starting with the "start register address". The number of registers to set with the data bytes following the "start register address" is determined by subtracting one (1) from the data length (DL). If the start register is an ASCII string register, the data length (DL) is ignored and the ASCII string is written. If an ASCII string register is the start register, the DATA is the string followed by an End Of text (0x03) to signify the checksum is the next byte.

A Poll for Group 1 data message requests a special data message containing cool setpoint, heat setpoint, mode, fan, hold and current temperature. A Poll for Group 2 data requests for a special data message containing Group 2 data. A Poll for Group 3 data requests for a special data message containing Group 3 data.

IT device responses to the host or PC 2510 include an Acknowledge, Negative Acknowledgement, Data, Group 1 Data, Group 2 Data and Group 3 Data. The Acknowledgement includes an indication that the information sent by the host or PC 2510 has been received and accepted. The Negative Acknowledge includes an indication that the information sent by the host or PC 2510 has been received but is invalid or out of range.

When the IT device is returning the Data requested in a "Poll for registers" message, if the start register is an ASCII string register, data length (DL) is ignored. If a response is to a string, said response will end with an End Of Text (0x03) to signify the end of string. Group 1 Data returned by the IT device may include the information in the registers corresponding to one or more of a cool setpoint, heat setpoint, mode, fan, hold, current temperature. The Group 2 Data returned by the IT device may include one or more of the settings in the registers associated with the Indoor Humidity (162), Dehumidify Setpoint (135), Humidify setpoint (134), Outside temperature (68), Filter days left (15), Energy Level (169). The Group 3 Data returned by the IT device may include one or more of the settings in the specific registers corresponding to Energy Level (169), Mid level setback (18), High level setback (19), Critical level setback (20), Energy Price (74), Energy total cost upper (170), Energy total cost lower (171), Medium price (165), High price (166), Critical price (167).

Table 9 is an exemplary list of registers and the data settings associated with the registers.

TABLE 9

| Register # | Setup: |
|---|---|
| 0 | (RO) Communication address of the thermostat (1-127) |
| 1 | (RO) Communication mode baud (0 = 300, 1 = 100, 42 = 1200, 54 = 2400, 126 = 9600, 211 = Day/Night) |
| 2 | (RO) System type (0/1 = Heat/Cool-Auto, 4/5 = Heat/Cool-Manual, 12/13 = Heat only, 20 = Cool only, odd = Fan on with heat, even = Fan off with heat) |
| 3 | Display Options (Bit 0: 0 = Celsius, 1 = Fahrenheit; Bit 1: 0 = 12 hour, 1 = 24 hour; Bit 2: 0 = Advanced display, 1 = Simple display) |
| 4 | Calibration offset (+\−30 Omni format units) |
| 5 | Low Cool Limit (51-91 Omni format units) |
| 6 | High Heat Limit (51-91 Omni format units) |
| 7 | Energy Efficient Control (Turn on, 1 or off, 0 the EEC) |
| 8 | Current OMNI version |
| 9 | Cool Anticipator (1-10, only valid in 1 stage units, 1 = AC comes on the cycles air frequently, 10 = infrequently) |
| 10 | Second stage differential (for multi stage units) |
| 11 | Cooling cycle time (2-30 minutes, ignored if used separate on/off times) |
| 12 | Heating cycle time (2-30 minutes, ignored if used separate on/off times) |
| 13 | Third stage differential (for multi stage units) |
| 14 | Clock adjust (+/−30 seconds per day, 0 = −30, 60 = +30) |
| 15 | Days remaining for filter reminder |
| 16 | (RO) System run time, current week - hours |
| 17 | (RO) System run time, last week - hours |

TABLE 9-continued

| Register # | |
|---|---|
| | Energy Setback Registers: |
| 18 | Number of degrees to setback for medium energy level (in Fahrenheit) |
| 19 | Number of degrees to setback for high energy level (in Fahrenheit) |
| 20 | Number of degrees to setback for critical energy level (in Fahrenheit) |
| | Programming Monday, Saturday, Sunday: |
| 21 | Programming Monday morning time (15 minute increments) |
| 22 | Programming Monday morning cool setpoint (in Omni format) |
| 23 | Programming Monday morning heat setpoint (in Omni format) |
| 24 | Programming Monday day time (15 minute increments) |
| 25 | Programming Monday day cool setpoint (in Omni format) |
| 26 | Programming Monday day heat setpoint (in Omni format) |
| 27 | Programming Monday evening time (15 minute increments) |
| 28 | Programming Monday evening cool setpoint (in Omni format) |
| 29 | Programming Monday evening heat setpoint (in Omni format) |
| 30 | Programming Monday night time (15 minute increments) |
| 31 | Programming Monday night cool setpoint (in Omni format) |
| 32 | Programming Monday night heat setpoint (in Omni format) |
| 33 | Programming Saturday morning time (15 minute increments) |
| 34 | Programming Saturday morning cool setpoint (in Omni format) |
| 35 | Programming Saturday morning heat setpoint (in Omni format) |
| 36 | Programming Saturday day time (15 minute increments) |
| 37 | Programming Saturday day cool setpoint (in Omni format) |
| 38 | Programming Saturday day heat setpoint (in Omni format) |
| 39 | Programming Saturday evening time (15 minute increments) |
| 40 | Programming Saturday evening cool setpoint (in Omni format) |
| 41 | Programming Saturday evening heat setpoint (in Omni format) |
| 42 | Programming Saturday night time (15 minute increments) |
| 43 | Programming Saturday night cool setpoint (in Omni format) |
| 44 | Programming Saturday night heat setpoint (in Omni format) |
| 45 | Programming Sunday morning time (15 minute increments) |
| 46 | Programming Sunday morning cool setpoint (in Omni format) |
| 47 | Programming Sunday morning heat setpoint (in Omni format) |
| 48 | Programming Sunday day time (15 minute increments) |
| 49 | Programming Sunday day cool setpoint (in Omni format) |
| 50 | Programming Sunday day heat setpoint (in Omni format) |
| 51 | Programming Sunday evening time (15 minute increments) |
| 52 | Programming Sunday evening cool setpoint (in Omni format) |
| 53 | Programming Sunday evening heat setpoint (in Omni format) |
| 54 | Programming Sunday night time (15 minute increments) |
| 55 | Programming Sunday night cool setpoint (in Omni format) |
| 56 | Programming Sunday night heat setpoint (in Omni format) |
| | Status: |
| 57 | Outside humidity |
| 58 | Current day of the week (0 = Sunday) |
| 59 | Cool Setpoint (51-91 in Omni format) |
| 60 | Heat Setpoint (51-91 in Omni format) |
| 61 | Current mode (0 = Off, 1 = Heat, 2 = Cool, 3 = Auto, 4 = EM Heat) |
| 62 | Fan mode (0 = Auto, 1 = On, 2 = Cycle) |
| 63 | Hold mode (0 = Off, 1 = On, 2 = Vacation) |
| 64 | Current temperature (in Omni format) |
| 65 | Current time - seconds (0-59) |
| 66 | Current time - minutes (0-59) |
| 67 | Current time - hours (0-23) |
| 68 | Current outside temperature (in Omni format) |
| 70 | Energy price level set by controller (0 = low, 1 = Mid, 2 = High, 4 = Critical) |
| 71 | Current mode (0 = Off, 1 = Heat, 2 = Cool) |
| 72 | Current status of Relays |
| 73 | Model number |
| 74 | Current energy cost (0-254, 255 = disabled) |
| | Programming Tuesday-Friday: |
| 75 | Programming Tuesday morning time (15 minute increments) |
| 76 | Programming Tuesday morning cool setpoint (in Omni format) |
| 77 | Programming Tuesday morning heat setpoint (in Omni format) |
| 78 | Programming Tuesday day time (15 minute increments) |
| 79 | Programming Tuesday day cool setpoint (in Omni format) |
| 80 | Programming Tuesday day heat setpoint (in Omni format) |

TABLE 9-continued

| Register # | |
|---|---|
| 81 | Programming Tuesday evening time (15 minute increments) |
| 82 | Programming Tuesday evening cool setpoint (in Omni format) |
| 83 | Programming Tuesday evening heat setpoint (in Omni format) |
| 84 | Programming Tuesday night time (15 minute increments) |
| 85 | Programming Tuesday night cool setpoint (in Omni format) |
| 86 | Programming Tuesday night heat setpoint (in Omni format) |
| 87 | Programming Wednesday morning time (15 minute increments) |
| 88 | Programming Wednesday morning cool setpoint (in Omni format) |
| 89 | Programming Wednesday morning heat setpoint (in Omni format) |
| 90 | Programming Wednesday day time (15 minute increments) |
| 91 | Programming Wednesday day cool setpoint (in Omni format) |
| 92 | Programming Wednesday day heat setpoint (in Omni format) |
| 93 | Programming Wednesday evening time (15 minute increments) |
| 94 | Programming Wednesday evening cool setpoint (in Omni format) |
| 95 | Programming Wednesday evening heat setpoint (in Omni format) |
| 96 | Programming Wednesday night time (15 minute increments) |
| 97 | Programming Wednesday night cool setpoint (in Omni format) |
| 98 | Programming Wednesday night heat setpoint (in Omni format) |
| 99 | Programming Thursday morning time (15 minute increments) |
| 100 | Programming Thursday morning cool setpoint (in Omni format) |
| 101 | Programming Thursday morning heat setpoint (in Omni format) |
| 102 | Programming Thursday day time (15 minute increments) |
| 103 | Programming Thursday day cool setpoint (in Omni format) |
| 104 | Programming Thursday day heat setpoint (in Omni format) |
| 105 | Programming Thursday evening time (15 minute increments) |
| 106 | Programming Thursday evening cool setpoint (in Omni format) |
| 107 | Programming Thursday evening heat setpoint (in Omni format) |
| 108 | Programming Thursday night time (15 minute increments) |
| 109 | Programming Thursday night cool setpoint (in Omni format) |
| 110 | Programming Thursday night heat setpoint (in Omni format) |
| 111 | Programming Friday morning time (15 minute increments) |
| 112 | Programming Friday morning cool setpoint (in Omni format) |
| 113 | Programming Friday morning heat setpoint (in Omni format) |
| 114 | Programming Friday day time (15 minute increments) |
| 115 | Programming Friday day cool setpoint (in Omni format) |
| 116 | Programming Friday day heat setpoint (in Omni format) |
| 117 | Programming Friday evening time (15 minute increments) |
| 118 | Programming Friday evening cool setpoint (in Omni format) |
| 119 | Programming Friday evening heat setpoint (in Omni format) |
| 120 | Programming Friday night time (15 minute increments) |
| 121 | Programming Friday night cool setpoint (in Omni format) |
| 122 | Programming Friday night heat setpoint (in Omni format) |
| 123 | Programming Day Cool setpoint (in Omni format) |
| 124 | Programming Day Heat setpoint (in Omni format) |
| 125 | Programming Night Cool setpoint (in Omni format) |
| 126 | Programming Night Heat setpoint (in Omni format) |
| 127 | Programming Away Cool setpoint (in Omni format) |
| 128 | Programming Away Heat setpoint (in Omni format) |
| 129 | Programming Vacation Cool setpoint (in Omni format) |
| 130 | Programming Vacation Heat setpoint (in Omni format) |
| | Setup: |
| 131 | Program mode (0 = None, 1 = Schedule, 2 = Occupancy) |
| 132 | Expansion baud (0 = 300, 1 = 100, 42 = 1200, 54 = 2400, 126 = 9600) |
| 133 | Days until filter reminder appears |
| 134 | Humidity Setpoint |
| 135 | Dehumidify Setpoint |
| 136 | Dehumidifier output options (0 = Not used, 1 = Standalone, 2 = variable speed fan) |
| 137 | Humidifier output (0 = Not used, 1 = Standalone) |
| 138 | Minutes out of 20 that fan is on during cycle (1-19) |
| 139 | Backlight settings (0 = Off, 1 = On, 2 = Auto) |
| 140 | Backlight color (0-100) |
| 141 | Backlight intensity (1-10) |
| 142 | Selective message enable/disable |
| 143 | Minimum on time for cool (2-30) |
| 144 | Minimum off time for cool (2-30) |
| 145 | Minimum on time for heat (2-30) |
| 146 | Minimum off time for heat (2-30) |
| 147 | System type (0 = Heat Pump, 1 = Conventional, 2 = Dual Fuel) |
| 148 | Reserved |
| 149 | End of vacation date: day |
| 151 | End of vacation date: hour |
| 152 | Hours HVAC used in Week 0 |

TABLE 9-continued

| Register # | |
|---|---|
| 153 | Hours HVAC used in Week 1 |
| 154 | Hours HVAC used in Week 2 |
| 155 | Hours HVAC used in Week 3 |
| 156 | Reserved |
| 157 | Reserved |
| 158 | Enable/disable individual temp sensors |
| 159 | Number of cool stages |
| 160 | Number of heat stages |
| 161 | Current occupancy mode (0 = Day, 1 = Night, 2 = Away, 3 = Vacation) |
| 162 | Current indoor humidity |
| 163 | Cool setpoint for vacation mode (51-91) |
| 164 | Heat setpoint for vacation mode (51-91) |
| | Energy: |
| 165 | Displayed price of energy with medium level energy |
| 166 | Displayed price of energy with high level energy |
| 167 | Displayed price of energy with critical level energy |
| 168 | Sensitivity setting for proximity sensor (0-15) |
| 169 | Energy level as set by the meter |
| 170 | Current energy total cost, upper byte |
| 171 | Current energy total cost, lower byte |
| 172 | STRING ASCII display for first load control module |
| 173 | STRING ASCII display for second load control module |
| 174 | STRING ASCII display for third load control module |
| 175 | STRING ASCII display for Energy message |
| 176 | STRING ASCII display for emergency broadcast message (not implemented) |
| 177 | STRING ASCII display for custom message (not implemented) |
| 178 | STRING ASCII display for energy graph title bar |
| 179 | STRING ASCII display for energy graph x axis |
| 180 | STRING ASCII display for energy graph y axis |
| 181 | STRING ASCII display for long messages (not implemented) |
| 182 | graph bar max height, upper byte |
| 183 | graph bar max height, lower byte |
| 184 | graph bar one value, upper byte |
| 185 | graph bar one value, lower byte |
| 186 | graph bar two value, upper byte |
| 187 | graph bar two value, lower byte |
| 188 | graph bar three value, upper byte |
| 189 | graph bar three value, lower byte |
| 190 | graph bar four value, upper byte |
| 191 | graph bar four value, lower byte |
| 192 | Status and enable/disable of each load control module |
| | Sensors: |
| 200 | Current temperature of sensor 3 |
| 201 | Current temperature of sensor 4 |
| 202 | Reserved |
| | Wireless: |
| 224 | Wireless Machine Access Control (MAC) address byte 1 |
| 225 | Wireless MAC address byte 2 |
| 226 | Wireless MAC address byte 3 |
| 227 | Wireless MAC address byte 4 |
| 228 | Wireless MAC address byte 5 |
| 229 | Wireless MAC address byte 6 |
| 230 | Wireless MAC address byte 7 |
| 231 | Wireless MAC address byte 8 |
| 232 | Wireless firmware version integer place |
| 233 | Wireless firmware version decimal place |
| 234 | Wireless strength (0-100) |
| 235 | Wireless buzzer enable or disable |
| 236 | Wireless Internet Protocol (IP) address byte 1 |
| 237 | Wireless IP address byte 2 |
| 238 | Wireless IP address byte 3 |
| 239 | Wireless IP address byte 4 |
| | Energy: |
| 240 | Medium Cycle Rate (0-80) |
| 241 | High Cycle Rate (0-80) |
| 242 | Critical Cycle Rate (0-80) |
| 243 | Energy Cycling Period |
| 244 | Energy Time Remaining (5 minute increments, time when energy goes back to low status) |
| 245 | Energy Options (bit0 - Fan on (1)/off (0) when in energy cycle; bit1 - Random startup (1)) |
| 253 | 253 Reserved |
| 254 | 254 Reserved |

Writing to the outside temperature register (68) will cause an IT device 100 to display the outside temperature every 4 seconds such as in the EMMB field 150. An IT device 100 will stop displaying the outside temperature if the register (68) is not refreshed at least every 5 minutes. Some registers have an upper and lower byte. These registers combine to make a 16 bit number (with possible values in the range of 0 to 65025, inclusive). The 10,000 decimal place is the decimal precision. For example, register 182 is 0x87 and register 183 is 0x07, which makes 0x8707 or 34567 in decimal. This combined value will be evaluated as 4.567.

In one configuration, the registers are 1 byte long. The temperatures are converted to an "Omni" format meaning one whole number to represent the Celsius and Fahrenheit values. The Omni format for the temperatures are 1 byte, 0 to 255 where 0 is −40 degrees Celsius and −40 degrees Fahrenheit and 255 is 87.5 degrees Celsius (C), 189 degrees Fahrenheit (F). Each whole number increment in the Omni format is 0.5 degrees Celsius as represented in Appendix A. The table presented in Appendix A converts the Omni temperature to degrees C. and F. In a Fahrenheit mode, the IT device rounds the display to the nearest whole degree in Fahrenheit. For example, 71.6 and 72.5 will be displayed as 72. In a Celsius mode, the IT device displays the temperature in half degree increments are displayed.

In exemplary embodiments, the processes may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium. Nonetheless, in various configurations, the steps of the processes described herein are performed in the depicted order or one or more of the steps may be performed contemporaneously, in parallel, or in a different order. Furthermore, one or more of the steps in the processes may be omitted or varied.

The term "computer storage medium" refers herein to any medium adapted for storing the instructions that cause the computer to execute the processes. By way of example, and not limitation, the computer storage medium may comprise solid-state memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

APPENDIX A

| Omni | Deg. C. | Deg. F. |
| --- | --- | --- |
| 0 | −40.0 | −40.0 |
| 1 | −39.5 | −39.1 |
| 2 | −39.0 | −38.2 |
| 3 | −38.5 | −37.3 |
| 4 | −38.0 | −36.4 |
| 5 | −37.5 | −35.5 |
| 6 | −37.0 | −34.6 |
| 7 | −36.5 | −33.7 |
| 8 | −36.0 | −32.8 |
| 9 | −35.5 | −31.9 |
| 10 | −35.0 | −31.0 |
| 11 | −34.5 | −30.1 |
| 12 | −34.0 | −29.2 |
| 13 | −33.5 | −28.3 |
| 14 | −33.0 | −27.4 |
| 15 | −32.5 | −26.5 |
| 16 | −32.0 | −25.6 |
| 17 | −31.5 | −24.7 |
| 18 | −31.0 | −23.8 |
| 19 | −30.5 | −22.9 |
| 20 | −30.0 | −22.0 |
| 21 | −29.5 | −21.1 |
| 22 | −29.0 | −20.2 |
| 23 | −28.5 | −19.3 |
| 24 | −28.0 | −18.4 |
| 25 | −27.5 | −17.5 |
| 26 | −27.0 | −16.6 |
| 27 | −26.5 | −15.7 |
| 28 | −26.0 | −14.4 |
| 29 | −25.5 | −13.9 |
| 30 | −25.0 | −13.0 |
| 31 | −24.5 | −12.1 |
| 32 | −24.0 | −11.2 |
| 33 | −23.5 | −10.3 |
| 34 | −23.0 | −09.4 |
| 35 | −22.5 | −08.5 |
| 36 | −22.0 | −07.6 |
| 37 | −21.5 | −06.7 |
| 38 | −21.0 | −05.8 |
| 39 | −20.5 | −04.9 |
| 40 | −20.0 | −04.0 |
| 41 | −19.5 | −03.1 |
| 42 | −19.0 | −02.2 |
| 43 | −18.5 | −01.3 |
| 44 | −18.0 | −00.4 |
| 45 | −17.5 | 00.5 |
| 46 | −17.0 | 01.4 |
| 47 | −16.5 | 02.3 |
| 48 | −16.0 | 03.2 |
| 49 | −15.5 | 04.1 |
| 50 | −15.0 | 05.0 |
| 51 | −14.5 | 05.9 |
| 52 | −14.0 | 06.8 |
| 53 | −13.5 | 07.7 |
| 54 | −13.0 | 08.6 |
| 55 | −12.5 | 09.5 |
| 56 | −12.0 | 10.4 |
| 57 | −11.5 | 11.3 |
| 58 | −11.0 | 12.2 |
| 59 | −10.5 | 13.1 |
| 60 | −10.0 | 14.0 |
| 61 | −09.5 | 14.9 |
| 62 | −09.0 | 15.8 |
| 63 | −08.5 | 16.7 |
| 64 | −08.0 | 17.6 |
| 65 | −07.5 | 18.5 |
| 66 | −07.0 | 19.4 |
| 67 | −06.5 | 20.3 |
| 68 | −06.0 | 21.2 |
| 69 | −05.5 | 22.1 |
| 70 | −05.0 | 23.0 |
| 71 | −04.5 | 23.9 |
| 72 | −04.0 | 24.8 |
| 73 | −03.5 | 25.7 |
| 74 | −03.0 | 26.6 |
| 75 | −02.5 | 27.5 |
| 76 | −02.0 | 28.4 |
| 77 | −01.5 | 29.3 |
| 78 | −01.0 | 30.2 |
| 79 | −00.5 | 31.1 |
| 80 | 0 | 32.0 |
| 81 | 00.5 | 32.9 |
| 82 | 01.0 | 33.8 |
| 83 | 01.5 | 34.7 |
| 84 | 02.0 | 35.6 |
| 85 | 02.5 | 36.5 |
| 86 | 03.0 | 37.4 |
| 87 | 03.5 | 38.3 |
| 88 | 04.0 | 39.2 |
| 89 | 04.5 | 40.1 |
| 90 | 05.0 | 41.0 |
| 91 | 05.5 | 41.9 |
| 92 | 06.0 | 42.8 |
| 93 | 06.5 | 43.7 |
| 94 | 07.0 | 44.6 |
| 95 | 07.5 | 45.5 |
| 96 | 08.0 | 46.4 |
| 97 | 08.5 | 47.3 |
| 98 | 09.0 | 48.2 |
| 99 | 09.5 | 49.1 |
| 100 | 10.0 | 50.0 |
| 101 | 10.5 | 50.9 |
| 102 | 11.0 | 51.8 |
| 103 | 11.5 | 52.7 |
| 104 | 12.0 | 53.6 |
| 105 | 12.5 | 54.5 |
| 106 | 13.0 | 55.4 |
| 107 | 13.5 | 56.3 |
| 108 | 14.0 | 57.2 |
| 109 | 14.5 | 58.1 |
| 110 | 15.0 | 59.0 |
| 111 | 15.5 | 59.9 |
| 112 | 16.0 | 60.8 |
| 113 | 16.5 | 61.7 |
| 114 | 17.0 | 62.6 |
| 115 | 17.5 | 63.5 |
| 116 | 18.0 | 64.4 |
| 117 | 18.5 | 65.3 |
| 118 | 19.0 | 66.2 |
| 119 | 19.5 | 67.1 |
| 120 | 20.0 | 68.0 |
| 121 | 20.5 | 68.9 |
| 122 | 21.0 | 69.8 |
| 123 | 21.5 | 70.7 |
| 124 | 22.0 | 71.6 |
| 125 | 22.5 | 72.5 |
| 126 | 23.0 | 73.4 |
| 127 | 23.5 | 74.3 |
| 128 | 24.0 | 75.2 |
| 129 | 24.5 | 76.1 |
| 130 | 25.0 | 77.0 |
| 131 | 25.5 | 77.9 |
| 132 | 26.0 | 78.8 |
| 133 | 26.5 | 79.7 |
| 134 | 27.0 | 80.6 |
| 135 | 27.5 | 81.5 |

APPENDIX A-continued

| Omni | Deg. C. | Deg. F. |
|---|---|---|
| 136 | 28.0 | 82.4 |
| 137 | 28.5 | 83.3 |
| 138 | 29.0 | 84.2 |
| 139 | 29.5 | 85.1 |
| 140 | 30.0 | 86.0 |
| 141 | 30.5 | 86.9 |
| 142 | 31.0 | 87.8 |
| 143 | 31.5 | 88.7 |
| 144 | 32.0 | 89.6 |
| 145 | 32.5 | 90.5 |
| 146 | 33.0 | 91.4 |
| 147 | 33.5 | 92.3 |
| 148 | 34.0 | 93.2 |
| 149 | 34.5 | 94.1 |
| 150 | 35.0 | 95.0 |
| 151 | 35.5 | 95.9 |
| 152 | 36.0 | 96.8 |
| 153 | 36.5 | 97.7 |
| 154 | 37.0 | 98.6 |
| 155 | 37.5 | 99.5 |
| 156 | 38.0 | 100.4 |
| 157 | 38.5 | 101.3 |
| 158 | 39.0 | 102.2 |
| 159 | 39.5 | 103.1 |
| 160 | 40.0 | 104.0 |
| 161 | 40.5 | 104.9 |
| 162 | 41.0 | 105.8 |
| 163 | 41.5 | 106.7 |
| 164 | 42.0 | 107.6 |
| 165 | 42.5 | 108.5 |
| 166 | 43.0 | 109.4 |
| 167 | 43.5 | 110.3 |
| 168 | 44.0 | 111.2 |
| 169 | 44.5 | 112.1 |
| 170 | 45.0 | 113.0 |
| 171 | 45.5 | 113.9 |
| 172 | 46.0 | 114.8 |
| 173 | 46.5 | 115.7 |
| 174 | 47.0 | 116.6 |
| 175 | 47.5 | 117.5 |
| 176 | 48.0 | 118.4 |
| 177 | 48.5 | 119.3 |
| 178 | 49.0 | 120.2 |
| 179 | 49.5 | 121.1 |
| 180 | 50.0 | 122.0 |
| 181 | 50.5 | 122.9 |
| 182 | 51.0 | 123.8 |
| 183 | 51.5 | 124.7 |
| 184 | 52.0 | 125.6 |
| 185 | 52.5 | 126.5 |
| 186 | 53.0 | 127.4 |
| 187 | 53.5 | 127.3 |
| 188 | 54.0 | 129.2 |
| 189 | 54.5 | 130.1 |
| 190 | 55.0 | 131.0 |
| 191 | 55.5 | 131.9 |
| 192 | 56.0 | 132.8 |
| 193 | 56.5 | 133.7 |
| 194 | 57.0 | 134.6 |
| 195 | 57.5 | 135.5 |
| 196 | 58.0 | 136.4 |
| 197 | 58.5 | 137.3 |
| 198 | 59.0 | 138.2 |
| 199 | 59.5 | 139.1 |
| 200 | 60.0 | 140.0 |
| 201 | 60.5 | 140.9 |
| 202 | 61.0 | 141.8 |
| 203 | 61.5 | 142.7 |
| 204 | 62.0 | 143.6 |
| 205 | 62.5 | 144.5 |
| 206 | 63.0 | 145.4 |
| 207 | 63.5 | 146.3 |
| 208 | 64.0 | 147.2 |
| 209 | 64.5 | 148.1 |
| 210 | 65.0 | 149.0 |
| 211 | 65.5 | 149.9 |
| 212 | 66.0 | 150.8 |
| 213 | 66.5 | 151.7 |
| 214 | 67.0 | 152.6 |
| 215 | 67.5 | 153.5 |
| 216 | 68.0 | 154.4 |
| 217 | 68.5 | 155.3 |
| 218 | 69.0 | 156.2 |
| 219 | 69.5 | 157.1 |
| 220 | 70.0 | 158.0 |
| 221 | 70.5 | 158.9 |
| 222 | 71.0 | 159.8 |
| 223 | 71.5 | 160.7 |
| 224 | 72.0 | 161.6 |
| 225 | 72.5 | 162.5 |
| 226 | 73.0 | 163.4 |
| 227 | 73.5 | 164.3 |
| 228 | 74.0 | 165.2 |
| 229 | 74.5 | 166.1 |
| 230 | 75.0 | 167.0 |
| 231 | 75.5 | 167.9 |
| 232 | 76.0 | 168.8 |
| 233 | 76.5 | 169.7 |
| 234 | 77.0 | 170.6 |
| 235 | 77.5 | 171.5 |
| 236 | 78.0 | 172.4 |
| 237 | 78.5 | 173.3 |
| 238 | 79.0 | 174.2 |
| 239 | 79.5 | 175.1 |
| 240 | 80.0 | 176.0 |
| 241 | 80.5 | 176.9 |
| 242 | 81.0 | 177.8 |
| 243 | 81.5 | 178.7 |
| 244 | 82.0 | 179.6 |
| 245 | 82.5 | 180.5 |
| 246 | 83.0 | 181.4 |
| 247 | 83.5 | 182.3 |
| 248 | 84.0 | 183.2 |
| 249 | 84.5 | 184.1 |
| 250 | 85.0 | 185.0 |
| 251 | 85.5 | 185.9 |
| 252 | 86.0 | 186.8 |
| 253 | 86.5 | 187.7 |
| 254 | 87.0 | 188.6 |
| 255 | 87.5 | 189.5 |

What is claimed is:

1. A thermostat device comprising:
a processor configured to execute a set of instructions operable to automatically retrieve and display current energy pricing set by a utility company and automatically adjust a current temperature setpoint by a predetermined temperature setback corresponding to a predetermined energy pricing when the current energy pricing corresponds to the predetermined energy pricing;
memory for storing the current energy pricing, the predetermined energy pricing, the current temperature setpoint and the predetermined temperature setback;
a graphic display coupled to the processor;
a color driver coupled to the processor; and
a multi-color display backlight coupled to the color driver and the graphic display and being configured to change a color of the backlight in response to fluctuations in a current Energy Level determined by the processor based on the current energy pricing;
wherein the graphic display is configured to display an energy cycle GPD, the energy cycle GPD comprises a plurality of cycling settings to turn on and off at least one air conditioning and heating (HVAC) system at a cycling rate within a period of time and a plurality of cycling energy prices wherein each cycling setting corresponds to a respective different one of the cycling energy prices; and the processor being configured to execute a set of instructions operable to automatically select a cycling setting from the plurality of cycling settings associated with a cycling energy price corresponding to the current energy pricing as a current cycling setting.

2. The thermostat device according to claim 1, wherein:
the graphic display is configured to display an energy cycle detail GPD, the energy cycle detail GPD comprising the current cycling setting, a cycle period corresponding to the current cycle setting, a time indicative of an expiration time for the current cycling setting and a number of minutes in the period of time for the current cycling setting.

3. The thermostat device according to claim 1, wherein the processor is configured to execute a set of instructions to automatically turn on a fan when the HVAC system is off during the cycle period.

4. The thermostat device of claim 1, wherein the processor is further configured to execute a set of instructions operable to determine and display real-time energy demand based on the current energy pricing.

5. The thermostat device according to claim 4, wherein the processor is further configured to execute a set of instructions operable to display a simulated utility meter wherein the real-time energy demand is represented on the simulated utility meter.

6. The thermostat device according to claim 4, wherein the processor is further configured to execute a set of instructions operable to calculate a total energy cost for a predetermined period based on the current energy pricing, and display a current Energy Level associated with the current energy pricing, the total energy cost, and the predetermined temperature setback.

7. The thermostat device according to claim 1, further comprising:
a thermostat housing configured to house the processor, the memory, the graphic display, the color driver and the multi-color display backlight wherein the thermostat housing is configured for mounting to a wall.

8. The thermostat device according to claim 1, further comprising:
a thermostat housing configured to house the processor, the memory, the graphic display, the color driver and the multi-color display backlight wherein the thermostat housing is mobile and includes a surface support to orient the thermostat housing upright.

9. The thermostat device according to claim 1, wherein the graphic display is further configured to display a home graphic page display (GPD) comprising one or more of a current temperature, the current temperature setpoint, and at least one energy management message.

10. The thermostat device according to claim 9, wherein the home GPD further comprises one or more of an indoor relative humidity, an outdoor relative humidity, a period indicator, a status indicator, a fan mode, and a thermostat mode.

11. The thermostat device according to claim 1, wherein:
the processor is further configured to execute a set of instructions operable to receive at least one customized setback setting, the at least one customized setback setting being associated with at least one predetermined energy pricing; and
the graphic display is further configured to display an energy setback graphic page display (GPD) comprising a plurality of setback settings each being associated with a respective different energy pricing and wherein at least one of the plurality of setback settings is the at least one customized setback setting.

12. The thermostat device according to claim 11, wherein:
the graphic display is further configured to display an energy GPD, the energy GPD comprising the current energy pricing, the predetermined temperature setback, and a current Energy Level associated with the current energy pricing.

13. The thermostat device according to claim 1, wherein the processor is further configured to execute a set of instructions to automatically turn on off at least one user selected remote load.

14. The thermostat device according to claim 1, further comprising:
a wireless interface configured to communicate with a utility meter to receive the current energy pricing.

15. The thermostat device according to claim 1, wherein:
the temperature setpoint is converted to an Omni format having one whole number to represent a Celsius (° C.) and Fahrenheit (° F.) temperature values, and
the Omni format for the temperature setpoint is 1 byte having the whole number values within a range of 0 to 255 where the 0 corresponds to −40° C. and −40° F. and the 255 corresponds to 87.5° C. and 189° F.

16. A computer program product having a computer readable medium with a set of instructions which when executed causes a processor to:
automatically retrieve and display current energy pricing set by a utility company;
automatically adjust a current temperature setpoint by a predetermined temperature setback corresponding to a predetermined energy pricing when the current energy pricing corresponds to the predetermined energy pricing;
store the current energy pricing, the predetermined energy pricing, the current temperature setpoint and the predetermined temperature setback;
change a color of a backlight in response to fluctuations in a current Energy Level based on the current energy pricing;
display an energy cycle GPD, the energy cycle GPD comprises a plurality of cycling settings to turn on and off at least one air conditioning and heating (HVAC) system at a cycling rate within a period of time and a plurality of cycling energy prices wherein each cycling setting corresponds to a respective different one of the cycling energy prices; and
automatically select a cycling setting from the plurality of cycling setting associated with a cycling energy price corresponding to the current energy pricing as a current cycling setting.

17. The computer program product according to claim 16, wherein execution of the set of instructions causes the processor to display an energy cycle detail GPD, the energy cycle detail GPD comprising the current cycling setting, a cycle period corresponding to the current cycle setting, a time indicative of an expiration time for the current cycling setting and a number of minutes in the period of time for the current cycling setting.

18. The computer program product according to claim 17, wherein execution of the set of instructions causes the processor to automatically turn on a fan when the HVAC system is off during the cycle period.

19. The computer program product according to claim 16, wherein execution of the set of instructions causes the processor to determine and display real-time energy demand based on the current energy pricing.

20. The computer program product according to claim 19, wherein execution of the set of instructions causes the processor to display a simulated utility meter wherein the real-time energy demand is represented on the simulated utility meter.

21. The computer program product according to claim 19, wherein execution of the set of instructions causes the processor to calculate a total energy cost for a predetermined period based on the current energy pricing, and display a current Energy Level associated with the current energy pricing, the total energy cost, and the predetermined temperature setback.

22. The computer program product according to claim 16, wherein execution of the set of instructions causes the processor to display a home graphic page display (GPD) comprising one or more of a current temperature, the current temperature setpoint, and at least one energy management message.

23. The computer program product according to claim 22, wherein the home GPD further comprises one or more of an indoor relative humidity, an outdoor relative humidity, a period indicator, a status indicator, a fan mode, and a thermostat mode.

24. The computer program product according to claim 16, wherein execution of the set of instructions causes the processor to receive at least one customized setback setting, the at least one customized setback setting being associated with at least one predetermined energy pricing; and
display an energy setback graphic page display (GPD) comprising a plurality of setback settings each being associated with a respective different energy pricing and wherein at least one of the plurality of setback settings is the at least one customized setback setting.

25. The computer program product according to claim 24, wherein execution of the set of instructions causes the processor to display an energy GPD, the energy GPD comprising the current energy pricing, the predetermined temperature setback, and a current Energy Level associated with the current energy pricing.

26. The computer program product according to claim 16, wherein execution of the set of instructions causes the processor to automatically turn on or off at least one user selected remote load.

27. The computer program product according to claim 16, wherein execution of the set of instructions causes the processor to communicate with a utility meter to receive the current energy pricing.

28. The computer program product according to claim 16, wherein execution of the set of instructions causes the processor to convert the temperature setpoint to an Omni format having one whole number to represent a Celsius (° C.) and Fahrenheit (° F.) temperature values.

29. A thermostat device comprising:
means for automatically retrieving and displaying current energy pricing set by a utility company;
means for automatically adjusting a current temperature setpoint by a predetermined temperature setback corresponding to a predetermined energy pricing when the current energy pricing corresponds to the predetermined energy pricing;
means for changing a color of a backlight in response to fluctuations in a current Energy Level based on the current energy pricing;
means for displaying an energy cycle GPD having a plurality of cycling settings to turn on and off at least one air conditioning and heating (HVAC) system at a cycling rate within a period of time and a plurality of cycling energy prices wherein each cycling setting corresponds to a respective different one of the cycling energy prices; and
means for automatically selecting a cycling setting from the plurality of cycling settings associated with a cycling energy price corresponding to the current energy pricing as a current cycling setting.

30. The thermostat device according to claim 29, further comprising means for displaying an energy cycle detail GPD having the current cycling setting, a cycle period corresponding to the current cycle setting, a time indicative of an expiration time for the current cycling setting and a number of minutes in the period of time for the current cycling setting.

31. The thermostat device according to claim 30, further comprising means for automatically turning on a fan when the HVAC system is off during the cycle period.

32. The thermostat device according to claim 29, further comprising means for determining and displaying real-time energy demand based on the current energy pricing.

33. The thermostat device according to claim 32, further comprising means for displaying a simulated utility meter wherein the real-time energy demand is represented on the simulated utility meter.

34. The thermostat device according to claim 33, further comprising means for calculating a total energy cost for a predetermined period based on the current energy pricing, and displaying a current Energy Level associated with the current energy pricing, the total energy cost, and the predetermined temperature setback.

35. The thermostat device according to claim 29, further comprising means for displaying a home graphic page display (GPD) having one or more of a current temperature, the current temperature setpoint, and at least one energy management message.

36. The thermostat device according to claim 35, wherein the home GPD further comprises one or more of an indoor relative humidity, an outdoor relative humidity, period indicator, status indicator, fan mode, and thermostat mode.

37. The thermostat device according to claim 29, further comprising means for receiving at least one customized setback setting, the at least one customized setback setting being associated with at least one predetermined energy pricing; and
means for displaying an energy setback graphic page display (GPD) having a plurality of setback settings each being associated with a respective different energy pricing and wherein at least one of the plurality of setback settings is the at least one customized setback setting.

38. The thermostat device according to claim 37, further comprising means for displaying an energy GPD having the current energy pricing, the predetermined temperature setback, and a current Energy Level associated with the current energy pricing.

39. The thermostat device according to claim 29, further comprising means for automatically turning on or off at least one user selected remote load.

40. The thermostat device according to claim 29, further comprising means for communicating with a utility meter to receive the current energy pricing.

41. The thermostat device according to claim 29, further comprising means for converting the temperature setpoint to an Omni format having one whole number to represent a Celsius (° C.) and Fahrenheit (° F.) temperature values.

42. A system comprising:
an intelligent thermostat (IT) device configured to automatically retrieve and display current energy pricing set by a utility company and automatically adjust a current temperature setpoint by a predetermined temperature setback corresponding to a predetermined energy pricing when the current energy pricing corresponds to the predetermined energy pricing, wherein said IT device comprises: a processor, a graphic display coupled to a processor, a color driver coupled to the processor; and a multi-color display backlight coupled to the color driver and the graphic display and being configured to change a color of the backlight in response to fluctuations in a current Energy Level determined by the processor based on the current energy pricing;

a wireless interface configured to communicate with a utility meter to receive the current energy pricing; and at least one air conditioning and heating (HVAC) system;

wherein the graphic display is configured to display an energy cycle GPD, where said energy cycle GPD comprises a plurality of cycling settings to turn on and off the at least one HVAC system at a cycling rate within a period of time and a plurality of cycling energy prices wherein each cycling setting corresponds to a respective different one of the cycling energy prices; and wherein said IT device is further configured to automatically select a cycling setting from the plurality of cycling setting associated with a cycling energy price corresponding to the current energy pricing as a current cycling setting.

43. The system according to claim 42, wherein:
the graphic display is configured to display an energy cycle detail GPD, the energy cycle detail GPD comprising the current cycling setting, a cycle period corresponding to the current cycle setting, a time indicative of an expiration time for the current cycling setting and a number of minutes in the period of time for the current cycling setting.

44. The system according to claim 42, wherein the IT device is further configured to automatically turn on a fan when the HVAC system is off during the cycle period.

45. The system according to claim 42, wherein the IT device is further configured to determine and display real-time energy demand based on the current energy pricing.

46. The system according to claim 45, wherein the IT device is further configured to display a simulated utility meter wherein the real-time energy demand is represented on the simulated utility meter.

47. The system according to claim 45, wherein the IT device is further configured to calculate a total energy cost for a predetermined period based on the current energy pricing, and display a current Energy Level associated with the current energy pricing, the total energy cost, and the predetermined temperature setback.

48. The system according to claim 42, wherein the IT device further comprises a thermostat housing configured to house the processor, the graphic display, the color driver and the multi-color display backlight, wherein said thermostat housing is configured for mounting to a wall.

49. The system according to claim 42, wherein the IT device further comprises a thermostat housing configured to house the processor, the graphic display, the color driver and the multi-color display backlight wherein the thermostat housing is mobile and includes a surface support to orient the thermostat housing upright.

50. The system according to claim 42, where the graphic display is configured to display a home graphic page display (GPD) comprising one or more of a current temperature, the current temperature setpoint, and at least one energy management message.

51. The system according to claim 50, wherein the home GPD further comprises one or more of an indoor relative humidity, an outdoor relative humidity, period indicator, status indicator, fan mode, and thermostat mode.

52. The system according to claim 42, wherein the IT device is further configured to receive at least one customized setback setting, the at least one customized setback setting being associated with at least one predetermined energy pricing; and
the graphic display is configured to display an energy setback graphic page display (GPD) comprising a plurality of setback settings each being associated with a respective different energy pricing and wherein at least one of the plurality of setback settings is the at least one customized setback setting.

53. The system according to claim 52, wherein the graphic display is configured to display an energy GPD, the energy GPD comprising the current energy pricing, the predetermined temperature setback, and a current Energy Level associated with the current energy pricing.

54. The system according to claim 42, wherein the graphic display is configured to display an energy cycle detail GPD, the energy cycle detail GPD comprising the current cycling setting, a cycle period corresponding to the current cycle setting, a time indicative of an expiration time for the current cycling setting and a number of minutes in the period of time for the current cycling setting.

55. The system according to claim 42, wherein the IT device is further configured to automatically turn on a fan when the HVAC system is off during the cycle period.

56. The system according to claim 42, further comprising a plurality of remote loads individually controllable by the IT device to turn on or off at least one remote load selected from the user, wherein the remote load comprises at least one of a pool pump, fountain, and water heater.

57. The system according to claim 56, further comprising: an interface module coupled to a respective one remote load of the plurality of remote loads wherein the interface module is in communication with at least one of the IT device and the utility meter.

58. The system according to claim 57, further comprising a wireless transceiver coupled to the utility meter and the interface module and wireless transceiver communicate via wireless transmission to the wireless transceiver.

59. The system according to claim 57, wherein the interface module is configured to be turned on or off by the utility company.

60. The system according to claim 42, further comprising a plurality of outdoor environmental sensors and a plurality of indoor environmental sensors coupled to the IT device.

61. The system according to claim 42, further comprising a plurality of IT devices, each having coupled thereto a heating and air conditioning (HVAC) system and at least one indoor environmental sensor.

62. The system according to claim 61, further comprising a personal computer coupled the plurality of IT devices.

63. The system according to claim 61, wherein during a cycling mode of the system, the plurality of IT devices are turned on for an on period and off for an off period during a cycle period wherein the off period for each IT device of the plurality of IT devices do not overlap during the cycle period.

64. The system according to claim 42, wherein the temperature setpoint is converted to an Omni format having one whole number to represent a Celsius (° C.) and Fahrenheit (° F.) temperature values, and
the Omni format for the temperature setpoint is 1 byte having the whole number values within a range of 0 to 255 where the 0 corresponds to −40° C. and −40° F. and the 255 corresponds to 87.5° C., 189° F.

* * * * *